(12) United States Patent
Ahn et al.

(10) Patent No.: US 10,812,428 B2
(45) Date of Patent: Oct. 20, 2020

(54) ELECTRONIC DEVICE FOR TRANSMITTING AND RECEIVING MESSAGE HAVING INTERACTION FOR OUTPUTTING HIDDEN MESSAGE AND METHOD FOR CONTROLLING THE ELECTRONIC DEVICE

(71) Applicant: Samsung Electronics Co., Ltd., Gyeonggi-do (KR)

(72) Inventors: Sohmin Ahn, Gyeonggi-do (KR); Gulji Chung, Gyeonggi-do (KR); Donggoo Kang, Gyeonggi-do (KR); Joohee Park, Gyeonggi-do (KR); Para Kang, Gyeonggi-do (KR); Sangchul Yi, Gyeonggi-do (KR); Chouljun Hwang, Gyeonggi-do (KR); Cheolho Cheong, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/276,755

(22) Filed: Feb. 15, 2019

(65) Prior Publication Data
US 2019/0260698 A1 Aug. 22, 2019

(30) Foreign Application Priority Data
Feb. 22, 2018 (KR) .................. 10-2018-0021038

(51) Int. Cl.
*G06F 13/00* (2006.01)
*H04L 12/58* (2006.01)
*G06F 3/0488* (2013.01)
(Continued)

(52) U.S. Cl.
CPC .......... *H04L 51/08* (2013.01); *G06F 3/04842* (2013.01); *G06F 3/04845* (2013.01);
(Continued)

(58) Field of Classification Search
CPC ...... G06F 13/00; G06F 3/011; G06F 3/04883; G06F 3/04842; G06F 3/04845;
(Continued)

(56) References Cited

U.S. PATENT DOCUMENTS

| | | |
|---|---|---|
| 9,602,286 B2 | 3/2017 | Bae et al. |
| 10,009,299 B2 | 6/2018 | Hong et al. |

(Continued)

FOREIGN PATENT DOCUMENTS

| | | |
|---|---|---|
| KR | 10-2013-0106152 A | 9/2013 |
| KR | 10-2014-0120196 A | 10/2014 |

(Continued)

OTHER PUBLICATIONS

International Search Report dated Jun. 10, 2019.

*Primary Examiner* — Robert B Harrell
(74) *Attorney, Agent, or Firm* — Cha & Reiter, LLC.

(57) ABSTRACT

An electronic device includes a communication interface, an input interface, a memory storing a message application for transmitting/receiving a message that includes a main message, a display, and a processor. The processor sets a first interaction for displaying a first hidden message on the main message, the first interaction including information about at least one of a type, an input position, an input frequency, an input time, and an input sequence of a user input used to display the first hidden message, generates the message to include the main message and the first hidden message, the message being configured such that the first hidden message is displayed on the main message when the user input used to display the first hidden message and corresponding to the set first interaction is received, and transmits the generated message to an external device through the communication interface.

20 Claims, 26 Drawing Sheets

(51) Int. Cl.
*G06F 3/0484* (2013.01)
*G06F 3/01* (2006.01)

(52) U.S. Cl.
CPC ...... *G06F 3/04847* (2013.01); *G06F 3/04883* (2013.01); *G06F 3/011* (2013.01); *G06F 2203/04804* (2013.01); *G06F 2203/04808* (2013.01)

(58) Field of Classification Search
CPC ....... G06F 3/04847; G06F 2203/04804; G06F 2203/04808; G06Q 10/107; H04L 9/32; H04L 9/3226; H04L 12/58; H04L 12/581; H04L 12/585; H04L 12/5855; H04L 29/06; H04L 51/08; H04L 51/066; H04L 63/04; H04L 63/083; H04L 63/205; H04L 63/0428; H04L 63/0435; H04W 4/12
USPC .......................................... 709/206; 713/153
See application file for complete search history.

(56) References Cited

U.S. PATENT DOCUMENTS

| | | |
|---|---|---|
| 2014/0298197 A1 | 10/2014 | Kwon |
| 2015/0007351 A1 | 1/2015 | Janajri et al. |
| 2015/0058630 A1 | 2/2015 | Bae et al. |
| 2016/0308840 A1* | 10/2016 | Munshi ................. H04L 9/3226 |
| 2016/0323213 A1 | 11/2016 | Hong et al. |
| 2017/0017616 A1 | 1/2017 | Elings et al. |

FOREIGN PATENT DOCUMENTS

| | | |
|---|---|---|
| KR | 10-2015-0016645 A | 2/2015 |
| KR | 10-2015-0022276 A | 3/2015 |
| KR | 10-2015-0076926 A | 7/2015 |
| KR | 10-2016-0128145 A | 11/2016 |
| KR | 10-1721333 B1 | 3/2017 |

* cited by examiner

ELECTRONIC DEVICE FOR TRANSMITTING AND RECEIVING MESSAGE HAVING INTERACTION FOR OUTPUTTING HIDDEN MESSAGE AND METHOD FOR CONTROLLING THE ELECTRONIC DEVICE

CROSS-REFERENCE TO RELATED APPLICATION(S)

This application is based on and claims priority under 35 U.S.C. § 119 to Korean Patent Application No. 10-2018-0021038, filed on Feb. 22, 2018, in the Korean Intellectual Property Office, the disclosure of which is incorporated by reference herein its entirety.

BACKGROUND

1. Field

The present disclosure generally relates to a messaging technology for transmitting and/or receiving messages between electronic devices.

2. Description of Related Art

With the development of communication technologies, various forms of electronic devices capable of data communication, such as smartphones, personal digital assistants (PDA), tablet PCs, smart TVs, mobile phones, portable computers (e.g., laptop computers), PCs, and the like, are widely distributed.

These electronic devices provide users with rich communication services such as messaging services capable of transmitting and receiving messages that include multimedia content. Examples of these messaging services include multimedia messaging service (MMS), e-mail, and the like, as well as services that simply transmit and receive text data and/or sound data.

The above information is presented as background information only to assist with an understanding of the present disclosure. No determination has been made, and no assertion is made, as to whether any of the above might be applicable as prior art with regard to the present disclosure.

SUMMARY

An electronic device may transmit or receive messages that include not only text data and sound data but also other content data such as multimedia content. The electronic device, after receiving the messages, may output the content included in the messages to the user when the user inputs a user input selecting a particular received message. In other words, the electronic device may provide only a limited user experience (UX) where each message only include a single piece of content, such as one still image or a single video.

Aspects of the present disclosure are to address at least the above-mentioned problems and/or disadvantages and to provide at least the advantages described below. Accordingly, an aspect of the present disclosure is to provide an electronic device that provides a messaging service where the messages include main messages and hidden messages, where the main messages and the hidden messages may both include multimedia content.

In accordance with an aspect of the present disclosure, an electronic device includes a communication interface for wired or wireless communication, an input interface for receiving a user input, a memory for storing a message application for transmitting or receiving a message that includes a main message, a display, and a processor electrically connected to the communication interface, the input interface, the memory, and the display. The processor sets a first interaction for displaying a first hidden message on the main message, the first interaction including information about at least one of a type, an input position, an input frequency, input time, and an input sequence of a user input used to display the first hidden message, generates the message to include the main message and the first hidden message, the message being configured such that the first hidden message is displayed on the main message when the user input used to display the first hidden message and corresponding to the set first interaction is received, and transmits the generated message to an external device through the communication interface.

In accordance with another aspect of the present disclosure, an electronic device includes a communication interface for wired or wireless communication, an input interface for receiving a user input, a memory for storing a message application for transmitting or receiving a message, a display, and a processor electrically connected to the communication interface, the input interface, the memory, and the display. The processor receives a message including a main message and a first hidden message through the communication interface, the message being configured such that the first hidden message is displayed on the main message when a user input corresponding to a first interaction is received, and the first interaction includes information about at least one of a type, an input position, an input frequency, input time, and an input sequence of the user input received through the input interface, displays the main message on the display, and displays the first hidden message on the main message when receiving the user input corresponding to the first interaction through the input interface.

According to embodiments of the present disclosure, the electronic devices, when receiving a user input corresponding to a set interaction, may display a hidden message in a message to a user, thereby providing the user with a richer user experience (UX).

In addition, the present disclosure may provide various other effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
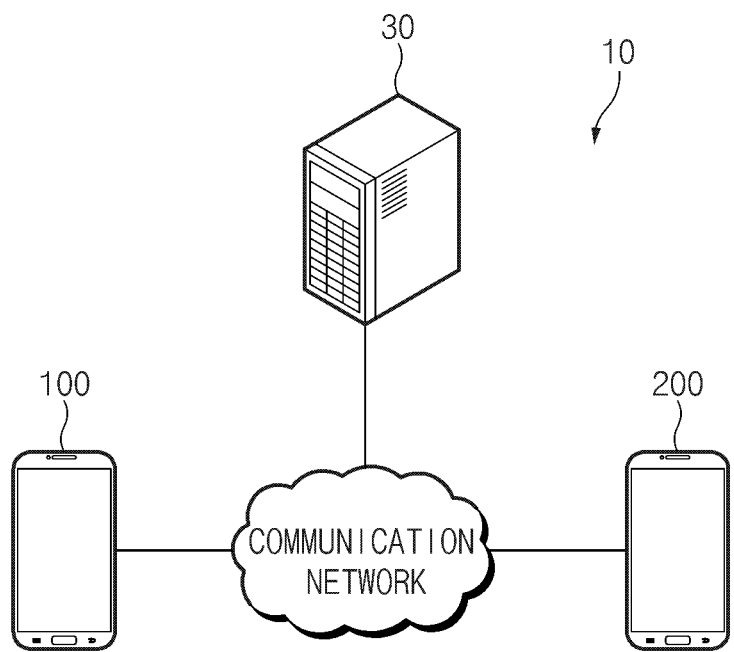
FIG. 1 is a diagram illustrating a message transmission/reception system according to an embodiment.

FIG. 1 is a diagram illustrating a message transmission/reception system 10 according to an embodiment.

Referring to FIG. 1, the message transmission/reception system 10 may include a first electronic device 100 and a second electronic device 200.

According to an embodiment, the first electronic device 100 and the second electronic device 200 may transmit and/or receive messages. For example, the first electronic device 100 and the second electronic device 200 may transmit and/or receive multimedia message service (MMS) messages that include multimedia content, as well as short message service (SMS) messages that generally only include text.

According to an embodiment, the first electronic device 100 may transmit a message to the second electronic device 200. In other words, the first electronic device 100 may be a transmitter. According to an embodiment, the second electronic device 200 may receive the message from the first electronic device 100. In other words, the second electronic device 200 may be a receiver.

According to an embodiment, the first electronic device 100 may generate the message to be transmitted. The message may include, for example, image (or video image) data and/or sound data. According to an embodiment, the first electronic device 100 may transmit the generated message to the second electronic device 200.

According to an embodiment, the second electronic device 200 may receive the message from the first electronic device 100. According to an embodiment, the second electronic device 200 may output the received message. For example, the second electronic device 200 may output the content included in the received message.

According to an embodiment, the first electronic device 100 may transmit a message through an external server 30. The external server 30 may transfer the message transmitted from the first electronic device 100, to the second electronic device 200. According to an embodiment, the external server 30 may manage the transmitted and received messages. For example, the external server 30 may store the transmitted messages in a database. According to an embodiment, the external server 30 may provide status information of the transmission and the reception to the first electronic device 100 or the second electronic device 200. For example, the external server 30 may provide, to the first electronic device 100, status information of a message received from the second electronic device 200.

According to an embodiment, the first electronic device 100 may receive information about the content stored in the external server 30 from the external server 30. According to an embodiment, the first electronic device 100 may include information about the content stored in the external server 30 in a message. The second electronic device 200 may receive specified content from the external server 30 using the information included in the message received from the first electronic device 100.

Figure 2:
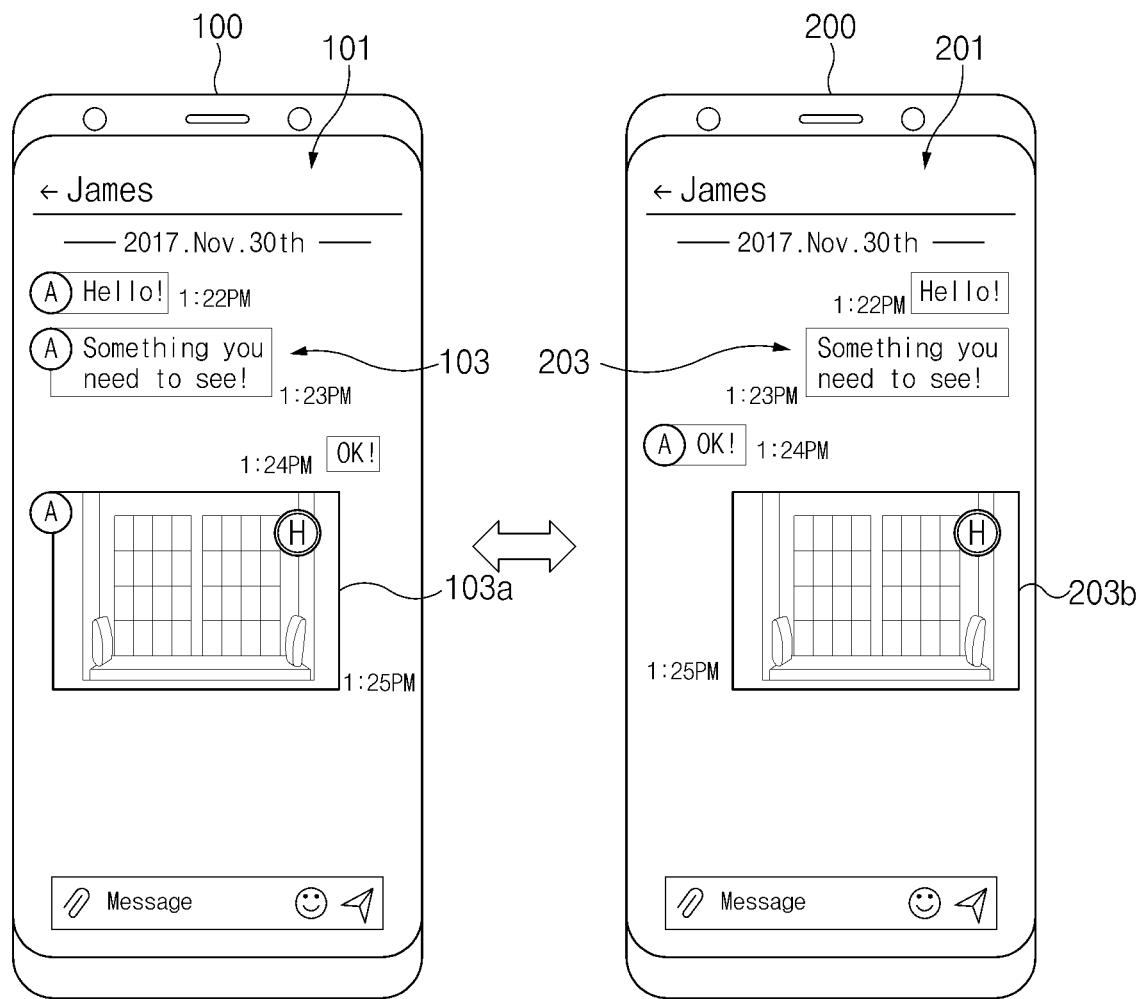
FIG. 2 are views illustrating messages transmitted or received by an electronic device through a message app according to an embodiment.

FIG. 2 are views illustrating messages transmitted or received by an electronic device through a message app (or application program) according to an embodiment.

Referring to FIG. 2, the first electronic device 100 may transmit a message including an image (or a video image) to the second electronic device 200.

According to an embodiment, the first electronic device 100 may execute a message app stored in its memory to transmit or receive the message. The first electronic device 100 may display a user interface (UI) 101 of the executed message app on a display. According to an embodiment, the first electronic device 100 may display transmitted or received messages 103 on the UI 101.

According to an embodiment, the first electronic device 100 may transmit a message 103a including the image to the second electronic device 200. The first electronic device 100 may display the image included in the message 103a on the UI 101.

According to an embodiment, the second electronic device 200 may execute a message app stored in its memory to transmit or receive messages. The second electronic device 200 may display a UI 201 of the executed message app on a display. According to an embodiment, the second electronic device 200 may display transmitted or received messages 203 on the UI 201.

According to an embodiment, the second electronic device 200 may receive a message 203b which includes the image from the first electronic device 100. The second electronic device 200 may display the message 203b including the image on the UI 201.

As shown above, the first electronic device 100 may transfer content (e.g. images) to the second electronic device 200 through messages. The second electronic device 200 may provide the content included in the messages to the user. Therefore, the first electronic device 100 and the second electronic device 200 only provides a simple user experience of transferring information through messages. In contrast, the electronic devices according to various embodiments of the present disclosure may transmit and receive messages that include hidden messages which may be displayed after processing a particular user interaction.

Figure 3:
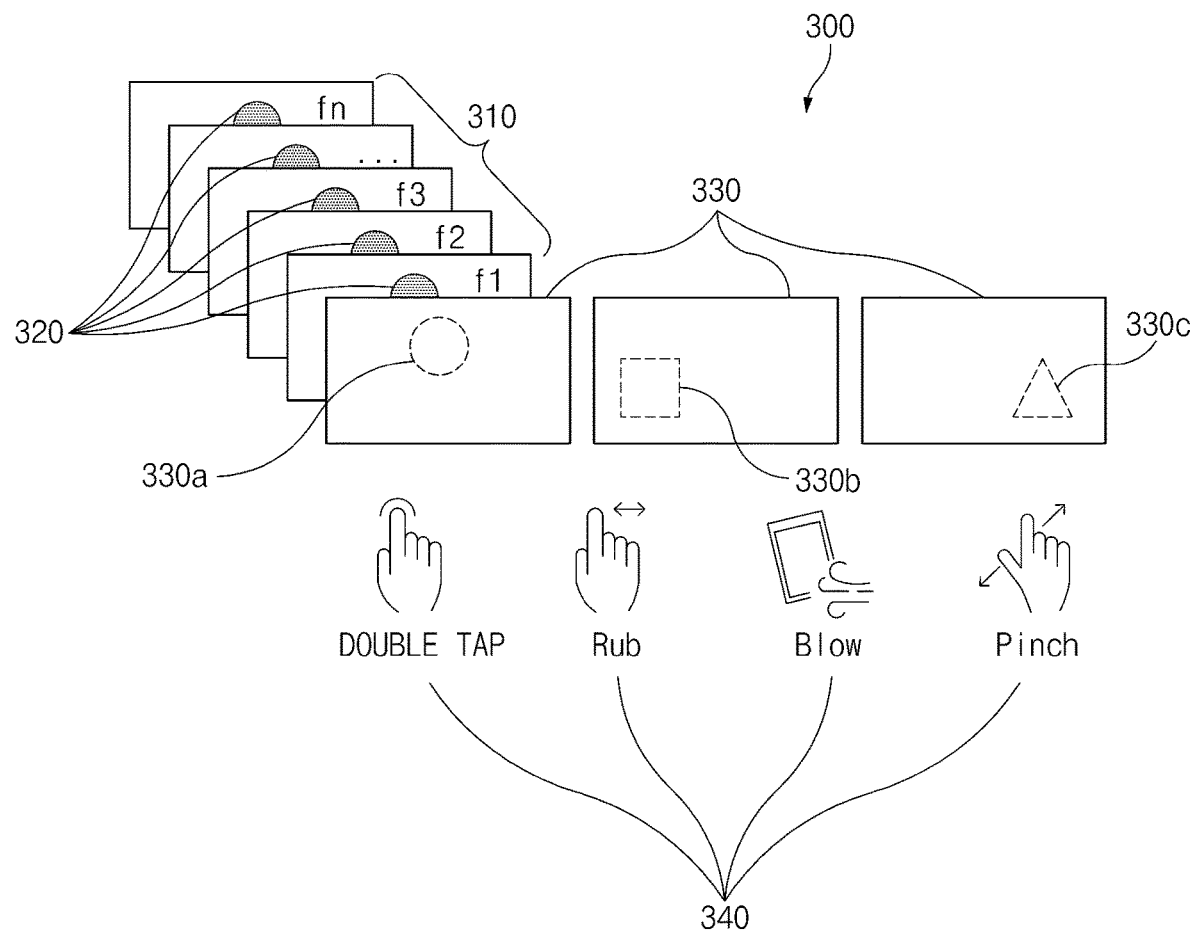
FIG. 3 is a view illustrating the configuration of a message generated by an electronic device according to an embodiment.

FIG. 3 is a view illustrating the configuration of a message generated by an electronic device according to an embodiment.

Referring to FIG. 3, the first electronic device 100 may transmit, to the second electronic device 200, a message 300 that includes a main message 310, a hidden message 320, a mask 330, and an interaction 340.

According to an embodiment, the main message 310 may be displayed on the second electronic device 200. For example, the second electronic device 200 may display the main message 310 on the display (or the UI of the message app) before performing the interaction 340 included in the message 300. According to an embodiment, the main message 310 may be a video image that includes a plurality of frames (e.g., a first frame f1, a second frame f2 . . . an n-th frame fn).

According to an embodiment, the hidden message 320 may be displayed on the main message 310 when the interaction 340 is performed on the second electronic device 200 and while the main message 310 is displayed on the display. For example, the hidden message 320 may be overlaid on the main message 310 when the interaction 340 is performed. According to an embodiment, the hidden message 320 may be a still image.

According to an embodiment, the mask 330 may include information about each area 330a, 330b, or 330c where the hidden message 320 is displayed on the main message 310. For example, the mask 330 may include information about areas where the hidden message 320 is to be displayed in the plurality of frames of the main message 310. According to an embodiment, the mask 330 may include information about time during which the hidden message 320 is to be displayed. For example, the mask 330 may include information about the frames (e.g., the first and last frames) where the hidden message 320 is to be displayed, among the plurality of frames of the main message 310.

According to an embodiment, the interaction 340 may be set in the message 300 so that the hidden message 320 may be displayed on the main message 310. The second electronic device 200 may perform the interaction 340 to display the hidden message 320 on the main message 310. The operation of performing the interaction 340 may include, for example, an operation of receiving a user input, an operation of determining whether the received user input agrees with specified (or set) input information, and an operation of determining a result (e.g., content) to be provided to the user, when it is determined that the received user input agrees with the specified input information. According to an embodiment, the interaction 340 may correspond to the user input. The user input may be, for example, a double tap input, a rub input, a blow input (e.g., a sound input to a microphone or detection of carbon dioxide by a gas sensor), and/or a pinch input. According to an embodiment, the interaction 340 may include information about the user input. The information about the user input may include information about, for example, at least one of the type, the input position, the input frequency, the input time, and the input sequence of the user input. According to an embodiment, the interaction 340 may include information about the area to which the user input is entered. The information about the area to which the user input is input may include, for example, coordinate information. According to an embodiment, the user input corresponding to the interaction 340 may be input to the area where the hidden message 320 is displayed. Alternatively, as described above, the hidden message 320 may be displayed on one of the areas 330a, 330b, and 330c specified by the mask 330.

Accordingly, when receiving the message 300 from the first electronic device 100 and performing the interaction 340 set in the message 300, the second electronic device 200 may display the still image (or the hidden message 320) in a specified area in a plurality of frames of the main message 310.

Figure 4:
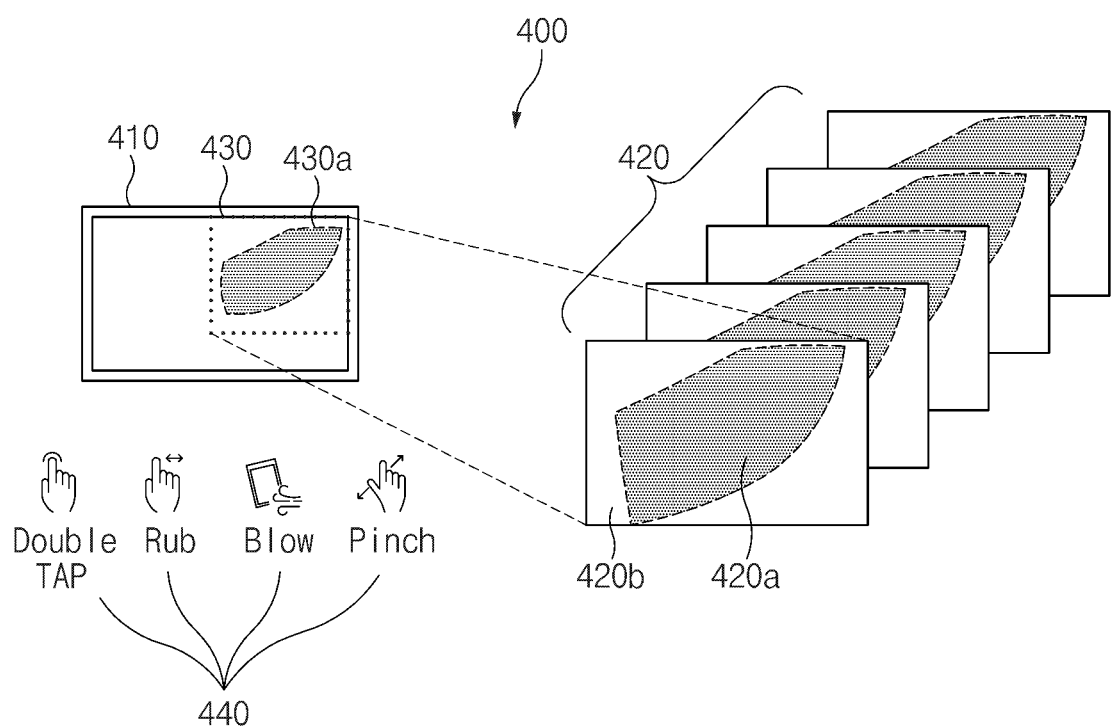
FIG. 4 is a view illustrating the configuration of a message generated by an electronic device according to an embodiment.

FIG. 4 is a view illustrating the configuration of a message generated by an electronic device according to an embodiment.

Referring to FIG. 4, the first electronic device 100 may transmit, to the second electronic device 200, a message 400 that includes a main message 410, a hidden message 420, a mask 430, and an interaction 440.

According to an embodiment, the main message 410 may correspond to the main message 310 of FIG. 3. According to an embodiment, the main message 410 may be a still image.

According to an embodiment, the hidden message 420 may correspond to the hidden message 320 of FIG. 3. According to an embodiment, the hidden message 420 may be a video image that includes a plurality of frames (e.g., a first frame f1, a second frame f2 . . . an n-th frame fn).

According to an embodiment, the mask 430 may correspond to the mask 330 of FIG. 3. For example, the mask 430 may include information about an area 430a where the hidden message 420 is to be displayed on the still image of the main message 410. Accordingly, each of the plurality of frames of the hidden message 420 may include an area 420a synthesized into or overlaid on the main message 410 by the mask 430 and an area 420b not being displayed on the main message 410.

According to an embodiment, the interaction 440 may be similar to the interaction 340 of FIG. 3. According to an embodiment, a user input corresponding to the interaction 440 may be input to the area 420*a* where the hidden message 420 is displayed.

Accordingly, when receiving the message 400 from the first electronic device 100 and performing the interaction 440 set in the message 400, the second electronic device 200 may display a plurality of frames of a video image (i.e. the hidden message 420) in the specified area 430*a* of the still image (i.e. the main message 410) displayed on the display.

Figure 5:
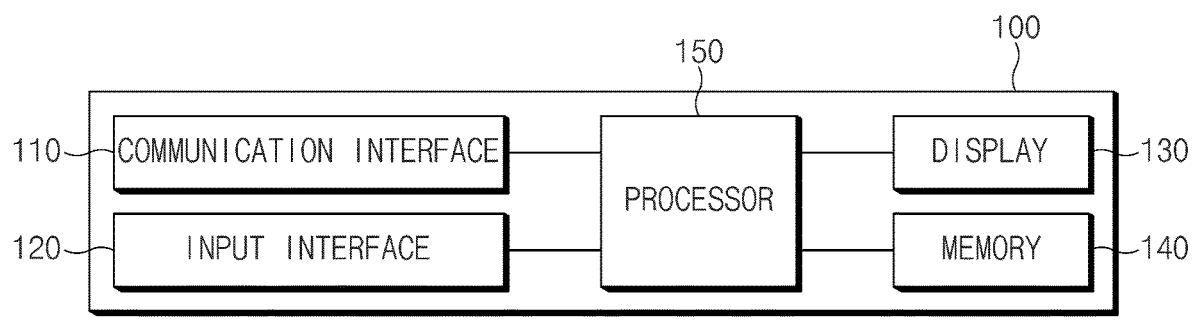
FIG. 5 is a block diagram illustrating the configuration of a first electronic device according to an embodiment.

FIG. 5 is a block diagram illustrating the configuration of the first electronic device according to an embodiment.

Referring to FIG. 5, the first electronic device 100 may include a communication interface 110, an input interface 120, a display 130, a memory 140, and a processor 150.

According to an embodiment, the communication interface 110 may be connected to an external device to transmit or receive data. For example, the communication interface 110 may be connected to the external device to transmit or receive messages. According to an embodiment, the communication interface 110 may include at least one of a wired communication interface and a wireless communication interface for transmitting or receiving data.

According to an embodiment, the input interface 120 may receive a user input for controlling the first electronic device 100. For example, the input interface 120 may include a touch panel coupled to the display 130 and may receive touch inputs of the user through the touch panel. The touch inputs may include, for example, a tap input (e.g., a double tap input) and a drag input (e.g., a rub input or a pinch input). In another example, the input interface 120 may include a microphone and may receive a sound input (e.g., a blow input) of the user through the microphone. In another example, the input interface 120 may include a gas sensor and may receive a blow input of the user (e.g., detection of carbon dioxide, detection of halitosis, or air pressure) through the gas sensor.

According to an embodiment, the display 130 may display images. For example, the display 130 may display UIs of executed applications and may display transmitted and received messages on the displayed UI of a message app. In another example, the display 130 may display content (e.g., images) included in the messages.

According to an embodiment, the memory 140 may store at least one application program (or app). For example, the memory 140 may store the message app for transmitting or receiving messages.

According to an embodiment, the processor 150 may be electrically connected to the communication interface 110, the input interface 120, the display 130, and the memory 140 and may control an overall operation of the first electronic device 100.

According to an embodiment, the processor 150 may receive a user input for selecting the main message, through the input interface 120. The main message may include, for example, a first image (or a main image). The processor 150 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 150 may receive a user input to select a first area of the main message for displaying a hidden message (i.e. a hidden image), through the input interface 120. For example, the processor 150 may display the main image on the display 130 and may receive a first user input for selecting the first area through the input interface 120.

According to an embodiment, the processor 150 may receive a user input for selecting the hidden message, through the input interface 120. The hidden message may include, for example, a hidden image.

According to an embodiment, the processor 150 may set an interaction for displaying the hidden message on the main message. The interaction may include information about, for example, at least one of the type, the input position, the input frequency, the input time, and the input sequence of a user input that is received through the input interface 120. In addition, the interaction may further include security information. The security information may include, for example, information identifying the user who is capable of performing the interaction (e.g., the user's biometric authentication information or electronic device identification information such as the user's phone number or IMEI number).

According to an embodiment, the processor 150 may receive a second user input for setting the interaction, through the input interface 120. For example, the processor 150 may display the main message on the display 130 and may receive the second user input through a second area of the main message displayed on the display 130. The second area may be, for example, the same area as the first area where the hidden message is displayed on the main message. According to an embodiment, based on the second user input, the processor 150 may determine at least one of the type, the input position, the input frequency, the input time, and the input sequence of the user input that will be used to display the hidden message. According to an embodiment, the processor 150 may store letters and numbers (e.g., a tap input (T), a rub input (R), twice (2), and the like) that correspond to the type, the input position, the input frequency, the input time, and the input sequence of the user input that will be used to display the hidden message.

According to an embodiment, the processor 150 may generate a message that includes a main message and a hidden message. For example, in the generated message, the hidden message may be displayed on the main message when a user input corresponding to the set interaction is received. The hidden message may be displayed as being overlaid on the main message. According to an embodiment, the hidden message may be displayed in the first area of the main message. For example, the processor 150 may display the hidden message in the first area of the main message after receiving a user input that agrees with the set interaction.

According to an embodiment, the message may be in various formats such as still image file formats (e.g., JPG, BMP, or the like), animation file formats (e.g., GIF), or video image file formats (e.g., mpeg, avi, WMV, or the like). According to an embodiment, the processor 150 may include URL information or meta-information of content in the generated message. According to an embodiment, the processor 150 may determine a representative image of the generated message. For example, the representative image may be determined to be one image (e.g., the first frame) among images included in the main message. In another example, the representative image may be an image in which the image in the main message (e.g. one frame of the main message) and the hidden message are synthesized together. In another example, the representative image may include a plurality of images.

According to an embodiment, the processor 150, when transmitting the generated message, may display a representative image of the message on the display 130 (or the UI of the message app). According to an embodiment, the processor 150 may display different representative images depending on the message processing status in the receiving device. For example, the processor 150 may display one of a plurality of images included in the representative image depending on the message processing status.

According to an embodiment, the processor 150 may transmit the generated message to an external device through the communication interface 110. The external device may be, for example, the second electronic device 200.

Figure 6:
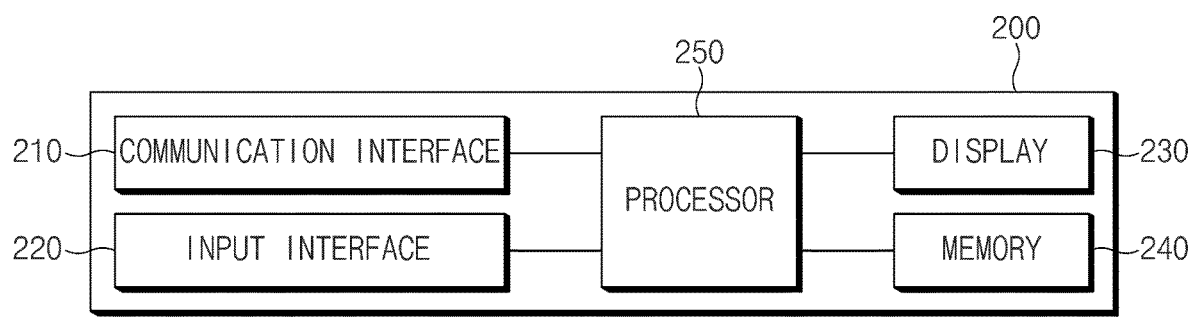
FIG. 6 is a block diagram illustrating the configuration of a second electronic device according to an embodiment.

FIG. 6 is a block diagram illustrating the configuration of the second electronic device according to an embodiment.

Referring to FIG. 6, the second electronic device 200 may include a communication interface 210, an input interface 220, a display 230, a memory 240, and a processor 250, similarly to the first electronic device 100 of FIG. 5.

According to an embodiment, the communication interface 210, the input interface 220, the display 230, and the memory 240 of the second electronic device 200 may be similar to the communication interface 110, the input interface 120, the display 130, and the memory 140 of the first electronic device 100 of FIG. 5, respectively.

According to an embodiment, the processor 250 may be electrically connected to the communication interface 210, the input interface 220, the display 230, and the memory 240 and may control an overall operation of the second electronic device 200.

According to an embodiment, the processor 250 may receive a message from an external device through the communication interface 210. The external device may be, for example, the first electronic device 100.

According to an embodiment, through the communication interface 210, the processor 250 may receive a message that includes a main message and a hidden message. For example, the hidden message may be displayed on the main message when a user input corresponding to the set interaction of the transmitted message is received.

According to an embodiment, the processor 250 may display the main message, which is included in the received message, on the display 230. The main message may include, for example, the first image.

According to an embodiment, the processor 250, when receiving the user input corresponding to the interaction, may display the hidden message on the main message displayed on the display 230. The processor 250 may display the second image of the hidden message on the first image of the main message. According to an embodiment, the hidden message may be displayed in a first area of the main message.

Figure 7:
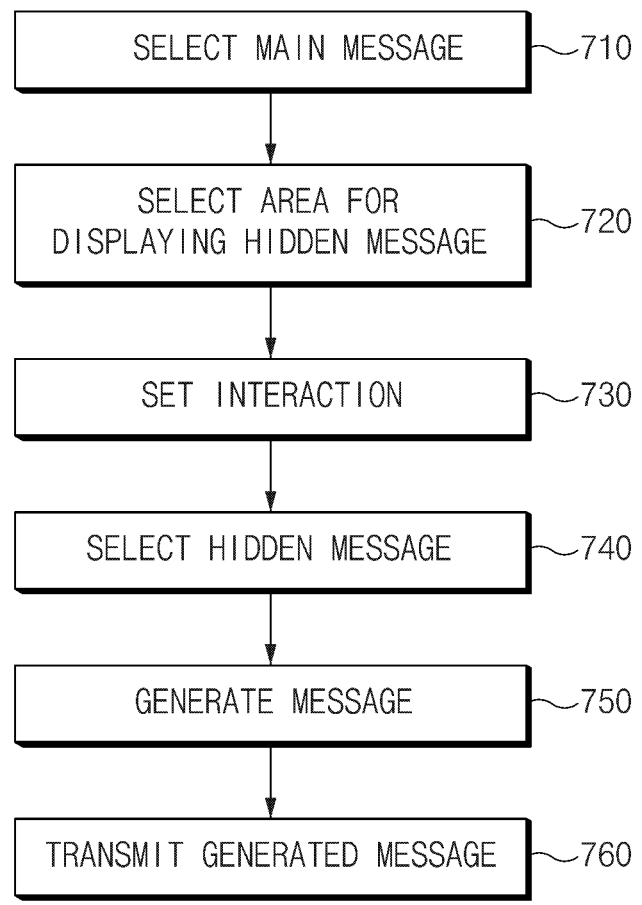
FIG. 7 is a flowchart illustrating a method of generating a message by the first electronic device according to an embodiment.

FIG. 7 is a flowchart illustrating a method of generating a message by the first electronic device according to an embodiment.

According to an embodiment, in operation 710, the first electronic device 100 (e.g., the processor 150) may select a main message. For example, the first electronic device 100 may receive a user input for selecting the main message. The main message may be, for example, a first image.

According to an embodiment, in operation 720, the first electronic device 100 may select a first area of the main message for displaying a hidden message. For example, the first electronic device 100 may receive a user input for selecting the first area.

According to an embodiment, in operation 730, the first electronic device 100 may perform an operation of setting an interaction. The first electronic device 100 may receive a user input for setting a user input corresponding to the interaction.

According to an embodiment, in operation 740, the first electronic device 100 may select a hidden message. For example, the first electronic device 100 may receive a user input for selecting the hidden message. The hidden message may include, for example, a second image.

According to an embodiment, in operation 750, the first electronic device 100 may generate a message that includes the main message and the hidden message. For example, the generated message may be constructed such that the hidden message is displayed on the main message when the user input corresponding to the set interaction is received.

According to an embodiment, in operation 760, the first electronic device 100 may transmit the generated message to an external device (e.g., the second electronic device 200).

According to another embodiment, the order or sequence of the operations shown in FIG. 7 may be changed. For example, the first electronic device 100 may select the hidden message and may then perform the operation of setting the interaction. In other words, the first electronic device 100 may change the sequence of operation 730 and operation 740.

Figure 8A:
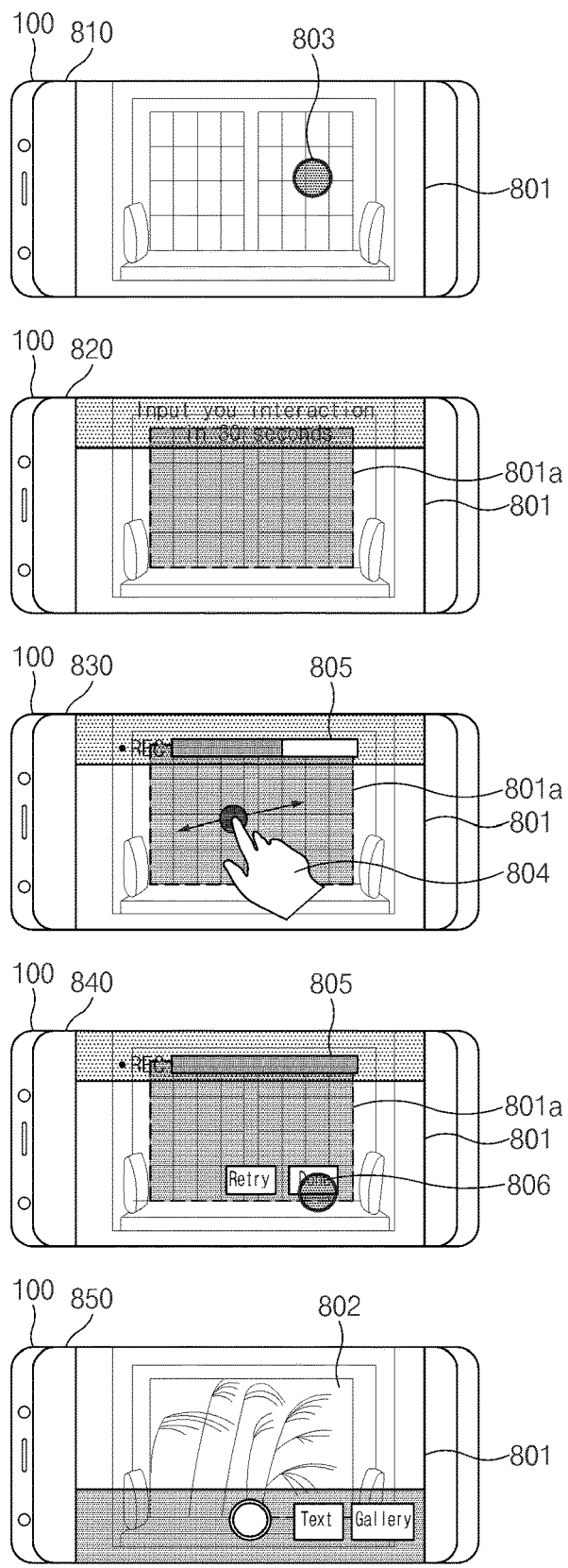
FIG. 8A and FIG. 8B are views illustrating screens on which the first electronic device generates a message according to an embodiment.
Figure 8B:
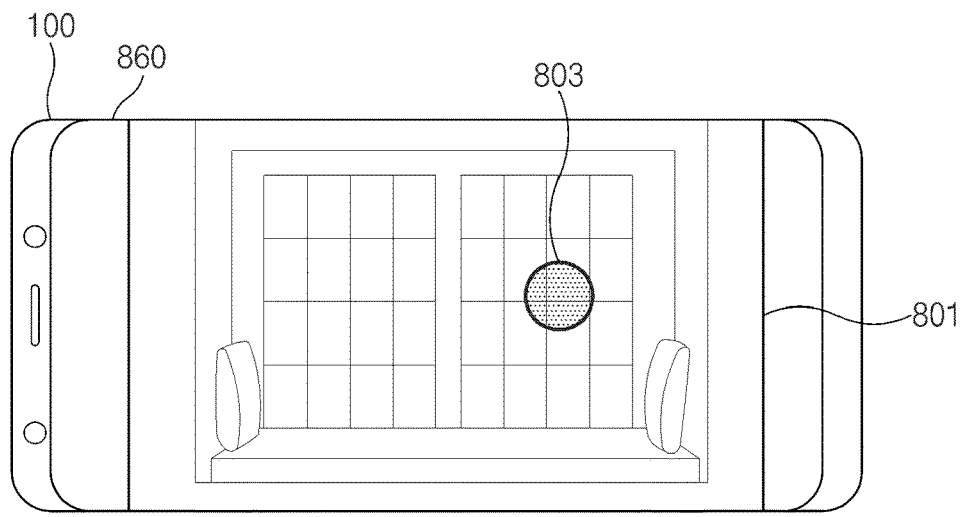
Figure 8B:
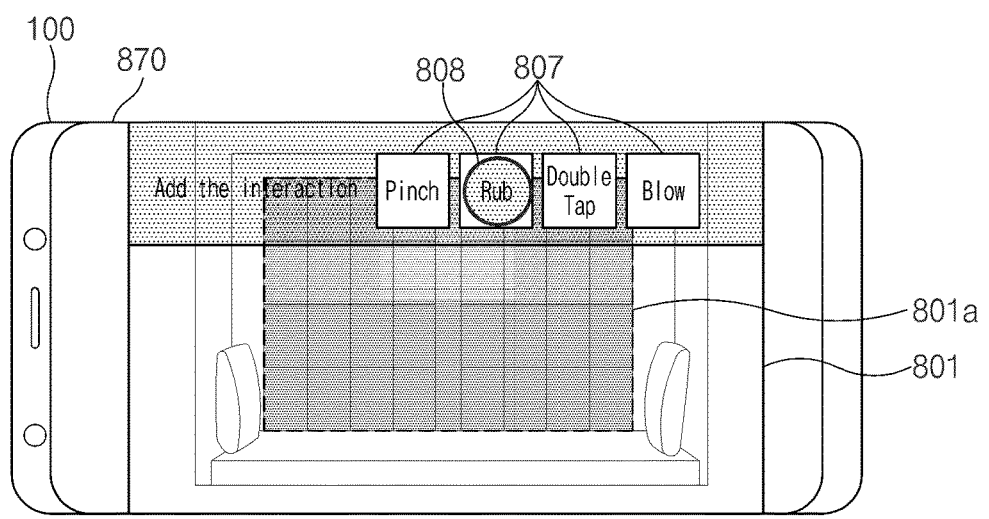
Figure 8B:
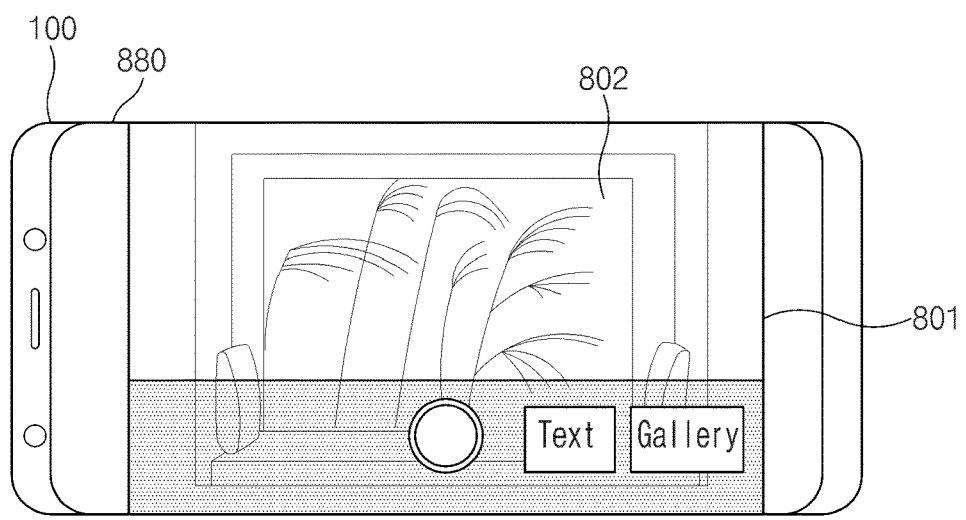

FIGS. 8A and 8B are views illustrating screens on which the first electronic device generates a message according to an embodiment.

FIG. 8A are views illustrating screens on which the first electronic device 100 generates a message with a single user input.

According to an embodiment, on screen 810, the first electronic device 100 may display a main message 801 on the display 130. The first electronic device 100 may receive a user input 803 to select at least a partial area of the main message 801 for displaying a hidden message 802. The user input 803 may be, for example, a touch input, a digital pen input, a pressure input, or a drag input for selecting a first area 801*a*.

According to an embodiment, on screen 820, the first electronic device 100 may display the first area 801*a* of the main message 801 for displaying the hidden message 802. The first area 801*a* may correspond to the previously selected area on screen 810.

According to an embodiment, on screen 830, the first electronic device 100 may receive a user input 804 for setting an interaction, in the first area 801*a* of the main message 801. For example, the first electronic device 100 may receive the user input 804 for setting the interaction within a specified period of time after the first area 801*a* is selected. Furthermore, the first electronic device 100 may display, on the display 130, an indicator 805 (e.g., an input time indicator) that shows progress of the specified period of time, thereby indicating time available for the user input 804. The user input 804 may be, in this example, a rub input. According to another embodiment, the first electronic device 100 may receive the user input for setting the interaction, through a second area that is different from the first area 801a.

According to an embodiment, on screen 840, the first electronic device 100 may receive an input 806 for confirming that the interaction is set.

According to an embodiment, on screen 850, the first electronic device 100 may receive a user input for selecting the hidden message 802 to be displayed in the first area 801a of the main message 801 and may display the selected hidden message 802. For example, on screen 850, the first electronic device 100 may display objects for image or video capture using a camera included in the first electronic device 100, text input, and image or video selection by executing an image app (e.g., a gallery app). For example, the executed image app may provide a list of selectable images or videos to the user.

FIG. 8B are views illustrating screens on which the first electronic device 100 generates a message by selecting one of a plurality of user inputs.

According to an embodiment, on screen 860, the first electronic device 100 may display the main message 801 on the display 130 and may receive the user input 803 to select the first area 801a of the main message 801 for displaying the hidden message 802.

According to an embodiment, on screen 870, the first electronic device 100 may display the first area 801a of the main message 801 for displaying the hidden message 802. According to an embodiment, the first electronic device 100 may display a plurality of objects 807 representing different types of user inputs for the interaction that causes the hidden message to be displayed. The plurality of objects 807 may include, for example, a pinch input, a rub input, a double tap input, and a blow input. The first electronic device 100 may receive a user input 808 for selecting the type of user input via the plurality of objects 807. The user input 808 may be, for example, a user input for selecting the rub input.

According to an embodiment, on screen 880, the first electronic device 100 may receive a user input for selecting the hidden message 802 to be displayed in the first area 801a of the main message 801.

Figure 9:
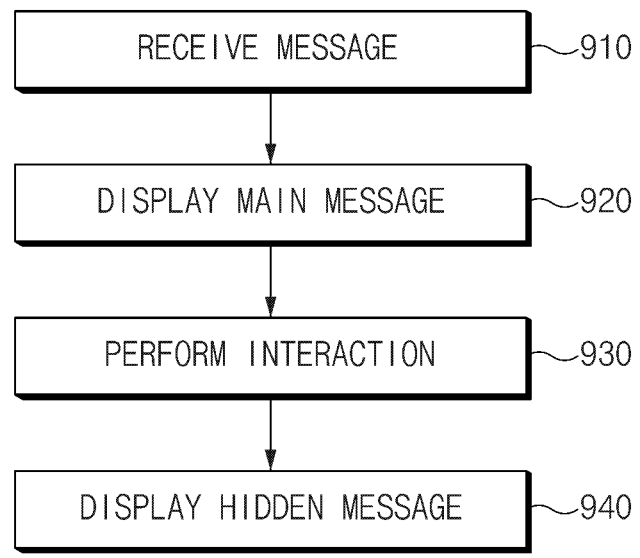
FIG. 9 is a flowchart illustrating a method of displaying a hidden message included in a received message by the second electronic device according to an embodiment.

FIG. 9 is a flowchart illustrating a method of displaying a hidden message included in a received message by the second electronic device according to an embodiment.

According to an embodiment, in operation 910, the second electronic device 200 (e.g., the processor 250) may receive a message that includes a main message and a hidden message.

According to an embodiment, in operation 920, the second electronic device 200 may display the main message on the display 230.

According to an embodiment, in operation 930, the second electronic device 200 may perform an interaction set in the message. As part of performing the interaction, the second electronic device 200 may receive a user input corresponding to the interaction from the user of the second electronic device 200.

According to an embodiment, in operation 940, the second electronic device 200 may display the hidden message on the main message, when the user input from the user agrees with the input information included in the interaction.

Figure 10:
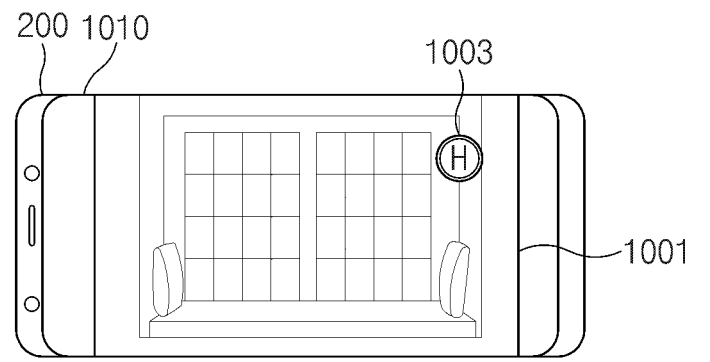
FIG. 10 are views illustrating screens on which the second electronic device displays a hidden message according to an embodiment.
Figure 10:
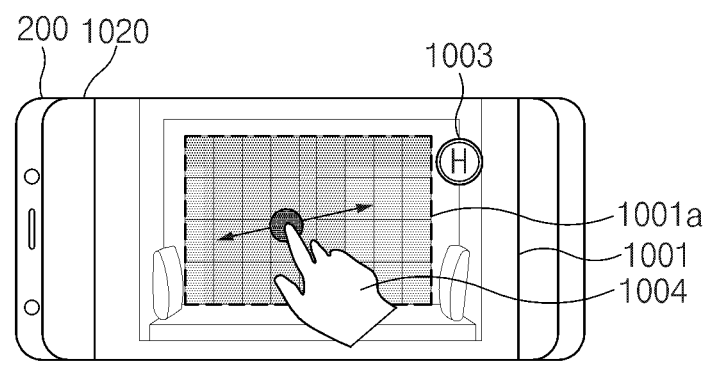
Figure 10:
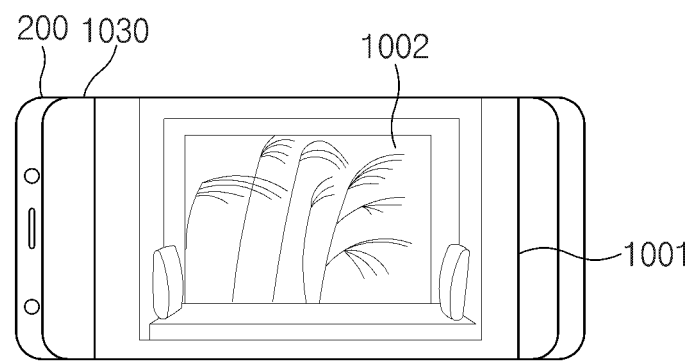

FIG. 10 are views illustrating screens on which the second electronic device displays a hidden message according to an embodiment.

According to an embodiment, on screen 1010, the second electronic device 200 may receive a message that includes a main message 1001 and a hidden message 1002 and may display the main message 1001 on the display 230. According to an embodiment, the second electronic device 200 may display, on the main message 1001, an indicator 1003 indicating that the received message includes the hidden message 1002.

According to an embodiment, on screen 1020, the second electronic device 200 may receive a user input 1004 corresponding to an interaction set in the message, through a first area 1001a of the main message 1001. The user input 1004 may be, for example, a rub input.

According to an embodiment, on screen 1030, the second electronic device 200 may display the hidden message 1002 in the first area 1001a of the main message 1001. For example, the second electronic device 200, after receiving the user input 1004 and determining that the user input 1004 corresponds to the interaction, may display the hidden message 1002 in the first area 1001a of the main message 1001.

Figure 11:
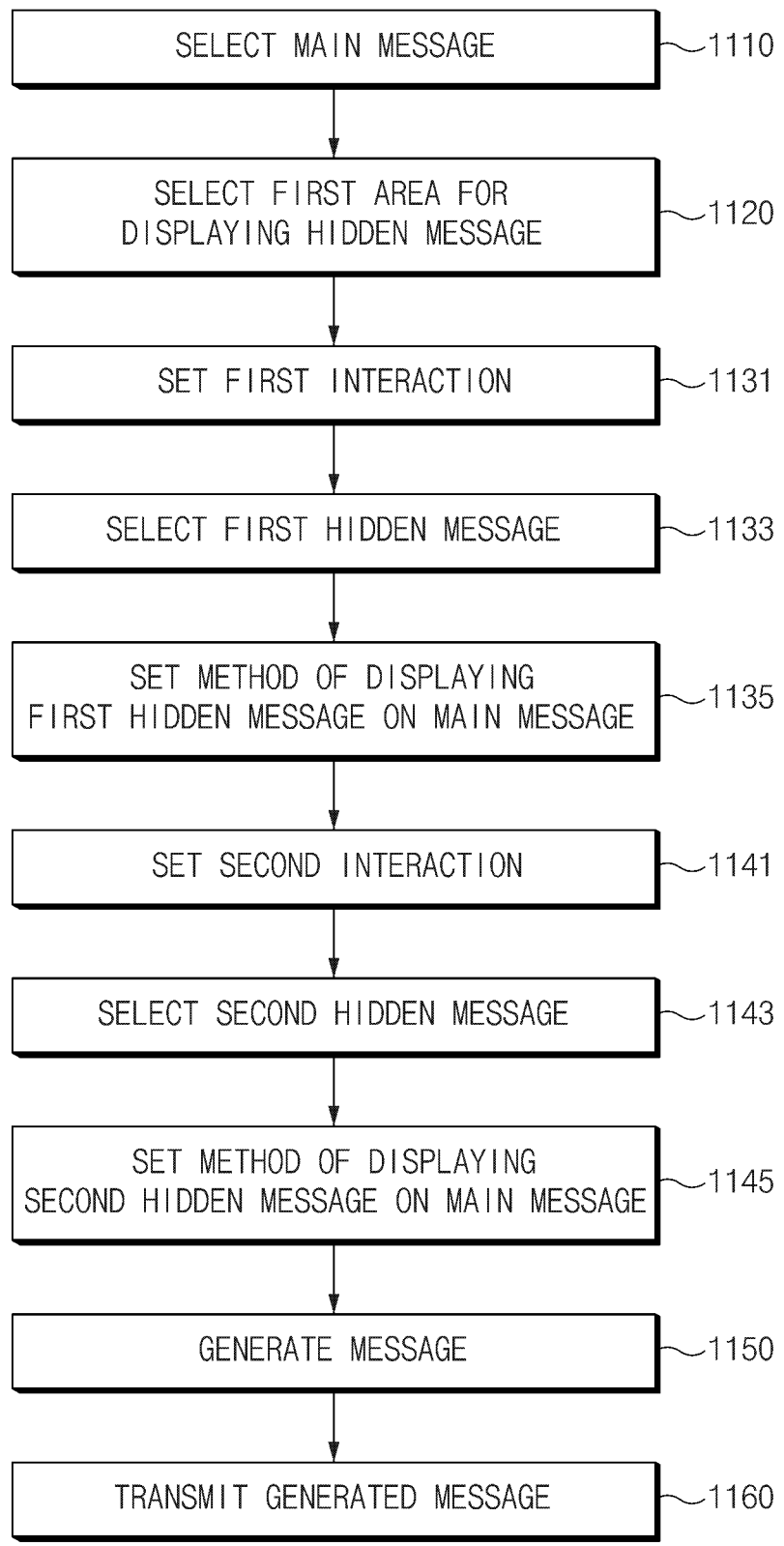
FIG. 11 is a flowchart illustrating a method of generating a message including a plurality of hidden messages by the first electronic device according to an embodiment.

FIG. 11 is a flowchart illustrating a method of generating a message including a plurality of hidden messages by the first electronic device according to an embodiment.

According to an embodiment, in operations 1110, 1120, 1131, and 1133, the first electronic device 100 (e.g., the processor 150) may select a main message and a first area, may perform an operation of setting a first interaction, and may select a first hidden message, as in operations 710, 720, 730, and 740 of FIG. 7.

According to an embodiment, in operation 1135, the first electronic device 100 may set a method of displaying the first hidden message on the main message. For example, the first electronic device 100 may set the transparency, the boundary blending, the size, the resolution, other image properties, and the video image playback time of the first hidden message.

According to an embodiment, in operation 1141, the first electronic device 100 may perform an operation of setting a second interaction. For example, the first electronic device 100 may receive a user input for setting a user input corresponding to the second interaction.

According to an embodiment, in operation 1143, the first electronic device 100 may select a second hidden message. For example, the first electronic device 100 may receive a user input for selecting the second hidden message. The second hidden message may include, for example, a third image.

According to an embodiment, in operation 1145, the first electronic device 100 may set a method of displaying the second hidden message on the main message, as in operation 1135.

According to an embodiment, in operation 1150, the first electronic device 100 may generate a message that includes the main message, the first hidden message, and the second hidden message. According to an embodiment, in operation 1160, the first electronic device 100 may transmit the generated message to an external device (e.g., the second electronic device 200).

According to another embodiment, the first electronic device 100 may additionally select at least one more hidden message, in addition to the first hidden message and the second hidden message. Furthermore, the first electronic device 100 may additionally set at least one more interaction, in addition to the first interaction and the second interaction.

Figure 12:
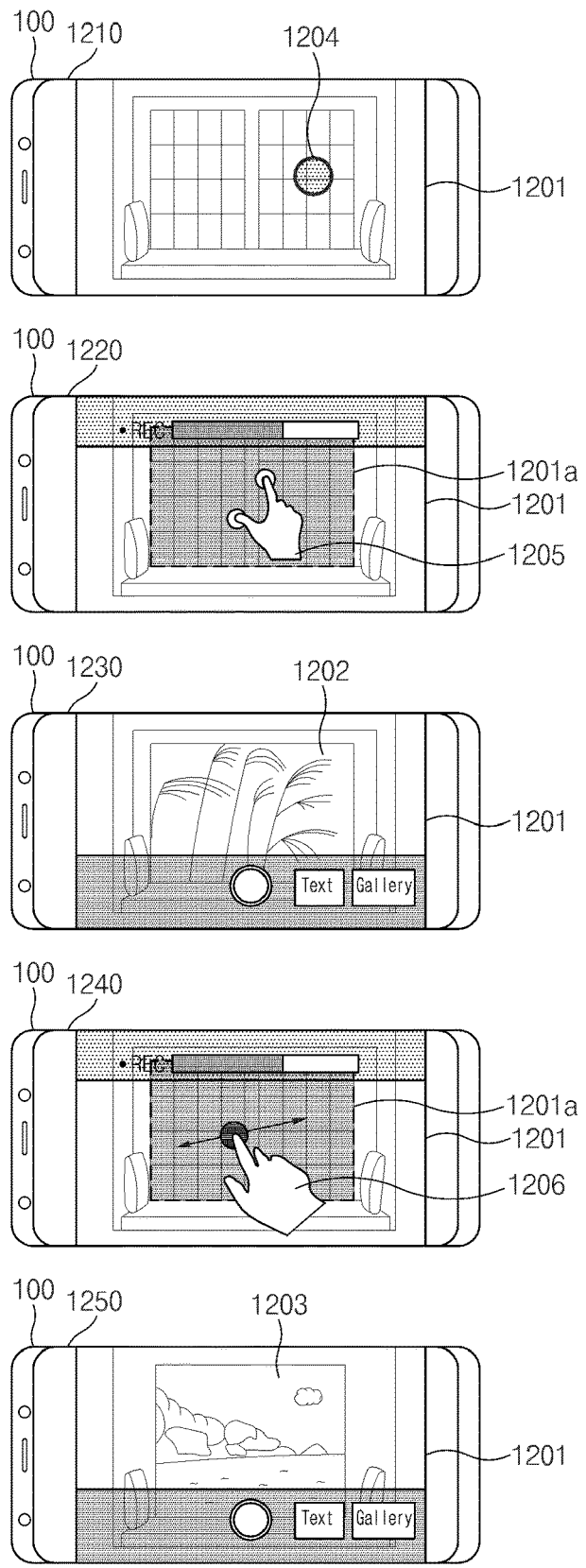
FIG. 12 are views illustrating screens on which the first electronic device generates a message including a plurality of hidden messages according to an embodiment.

FIG. 12 are views illustrating screens on which the first electronic device generates a message including a plurality of hidden messages according to an embodiment.

According to an embodiment, on screens 1210, 1220, and 1230, the first electronic device 100 may display a main message 1201 on the display 130, may receive a user input 1204 to select a first area 1201a of the main message 1201 for displaying hidden messages 1202 and 1203, and may receive a user input 1205 for setting a first interaction (e.g., a pinch input), as on screens 810, 830, and 850 of FIG. 8A. The first electronic device 100 may receive a user input for selecting the first hidden message 1202 (e.g., a tree image) in screen 1230.

According to an embodiment, on screens 1240 and 1250, the first electronic device 100 may receive a user input 1206 for setting a second interaction (e.g., a rub input) and may receive a user input for selecting the second hidden message 1203 (e.g., a beach image), as on screens 830 and 850 of FIG. 8A.

Figure 13:
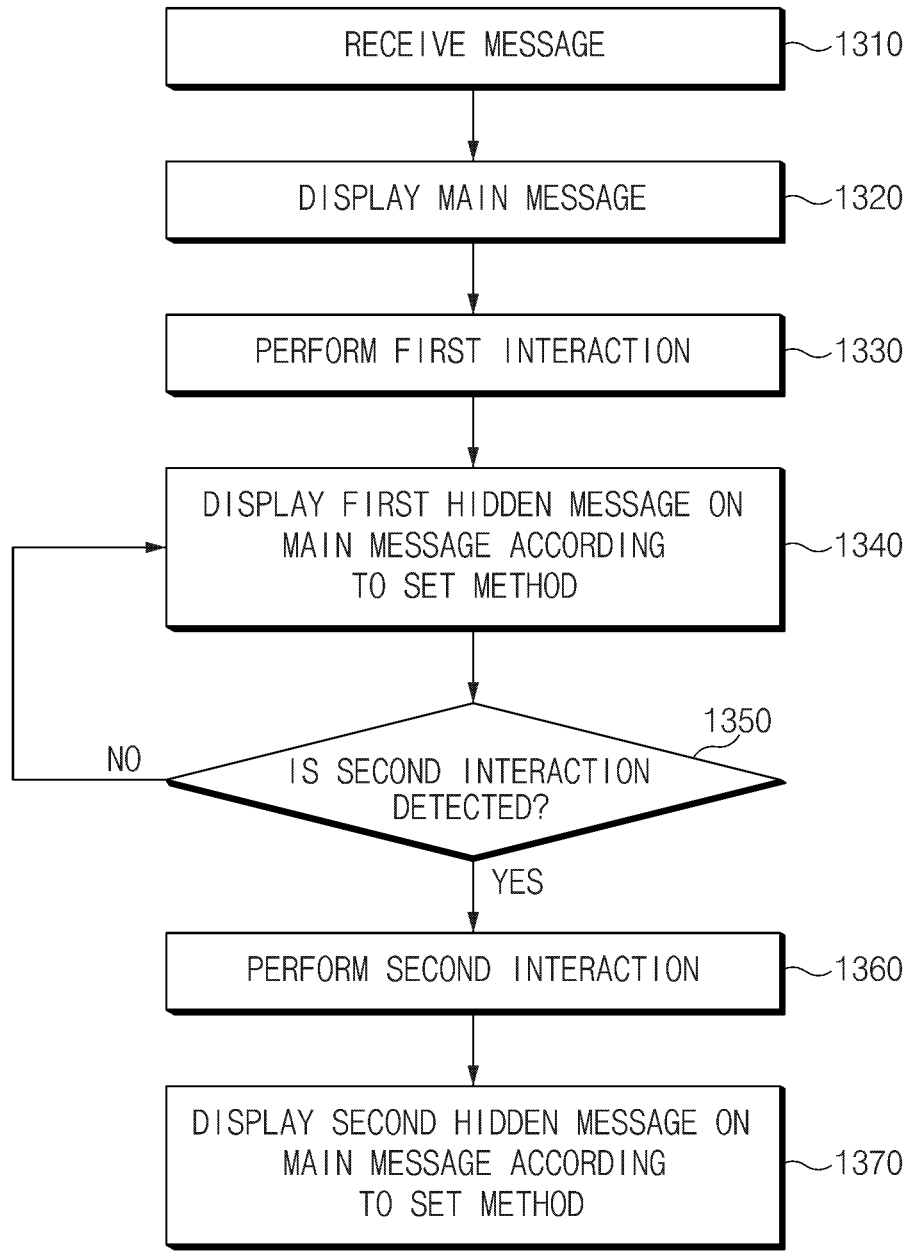
FIG. 13 is a flowchart illustrating a method of displaying a plurality of hidden messages included in a received message by the second electronic device according to an embodiment.

FIG. 13 is a flowchart illustrating a method of displaying a plurality of hidden messages included in a received message by the second electronic device according to an embodiment.

According to an embodiment, in operations 1310, 1320, and 1330, the second electronic device 200 (e.g., the processor 250) may receive a message that includes a main message, a first hidden message, and a second hidden message, may display the main message on the display 230, and may perform a first interaction, as in operations 910, 920, and 930 of FIG. 9.

According to an embodiment, in operation 1340, the second electronic device 200 may display the first hidden message on the main message according to a method set in the message. For example, the second electronic device 200 may display the first hidden message on the main message according to the transparency, the boundary blending, the size, the resolution, other image properties, and the video image playback time of the first hidden message specified in the received message.

According to an embodiment, in operation 1350, the second electronic device 200 may determine whether a second interaction is detected. For example, the second electronic device 200 may determine whether a user input corresponding to the second interaction is received. According to an embodiment, when it is determined that the second interaction is not detected, the second electronic device 200 may continually display the first hidden message corresponding to the first interaction. According to an embodiment, when the first hidden message is a video, the second electronic device 200 may perform operation 1320 and the subsequent operations again when the first hidden message is completely played back even when operation 1350 initially does not detect the second interaction.

According to an embodiment, in operation 1360, the second electronic device 200 may perform the second interaction when it is determined that a user input for performing the second interaction is detected. According to an embodiment, in operation 1370, the second electronic device 200 may display the second hidden message on the main message according to a method set in the message.

Figure 14:
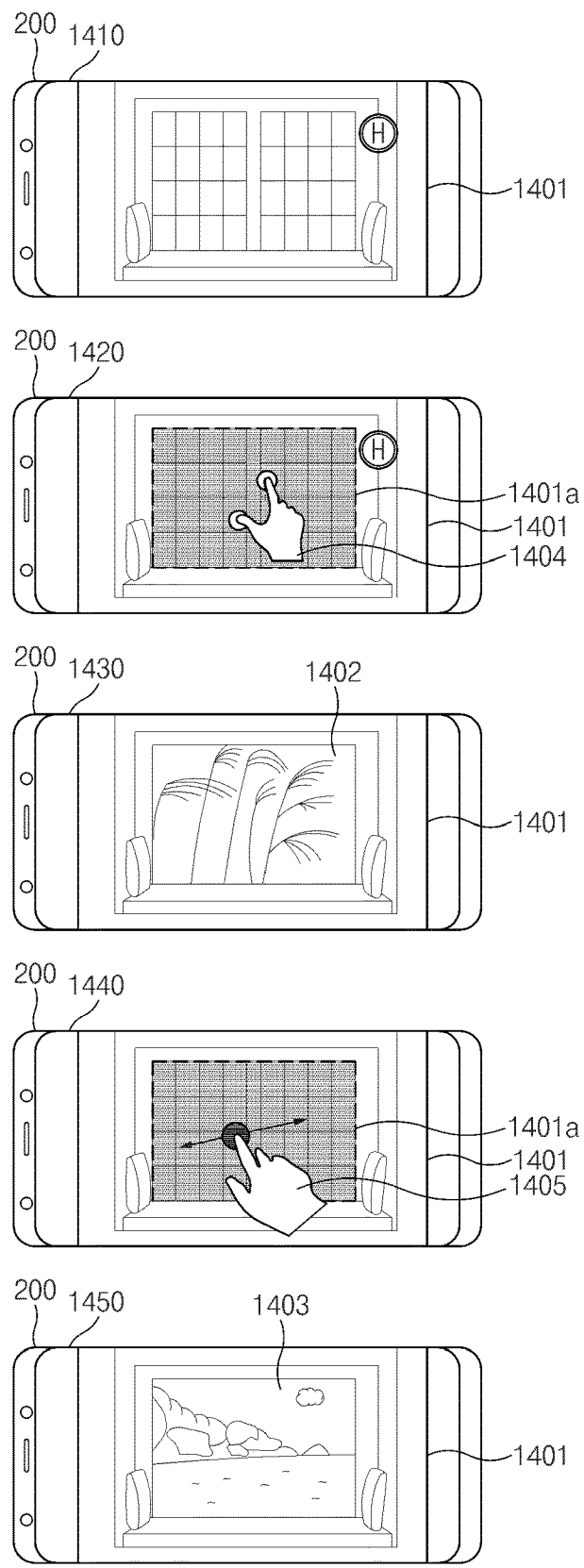
FIG. 14 are views illustrating screens on which the second electronic device displays a plurality of hidden messages according to an embodiment.

FIG. 14 are views illustrating screens on which the second electronic device displays a plurality of hidden messages according to an embodiment.

According to an embodiment, on screens 1410, 1420, and 1430, the second electronic device 200 may receive a message that includes a main message 1401, a first hidden message 1402, and a second hidden message 1403, may display the main message 1401 on the display 230, may receive a user input 1404 (e.g., a pinch input) corresponding to a first interaction set in the message, through a first area 1401a of the main message 1401, and may display the first hidden message 1402 (e.g., a tree image) in the first area 1401a of the main message 1401, as on screens 1010, 1020, and 1030 of FIG. 10.

According to an embodiment, on screen 1440, the second electronic device 200 may perform a second interaction when detecting a user input 1405 (e.g., a rub input) corresponding to the second interaction set in the message. The second electronic device 200 may receive the user input 1405 corresponding to the second interaction. According to another embodiment, when detecting the user input 1405 corresponding to the second interaction set in the message through the first area 1401a while playing back the first hidden message 1402, the second electronic device 200 may continually display the first hidden message 1402 until performance of the second interaction is complete.

According to an embodiment, on screen 1450, the second electronic device 200 may perform an operation corresponding to the second interaction, as on screen 1030 of FIG. 10. For example, the second electronic device 200 may display the second hidden message 1403 (e.g., a beach image) in the first area 1401a of the main message 1401.

Figure 15:
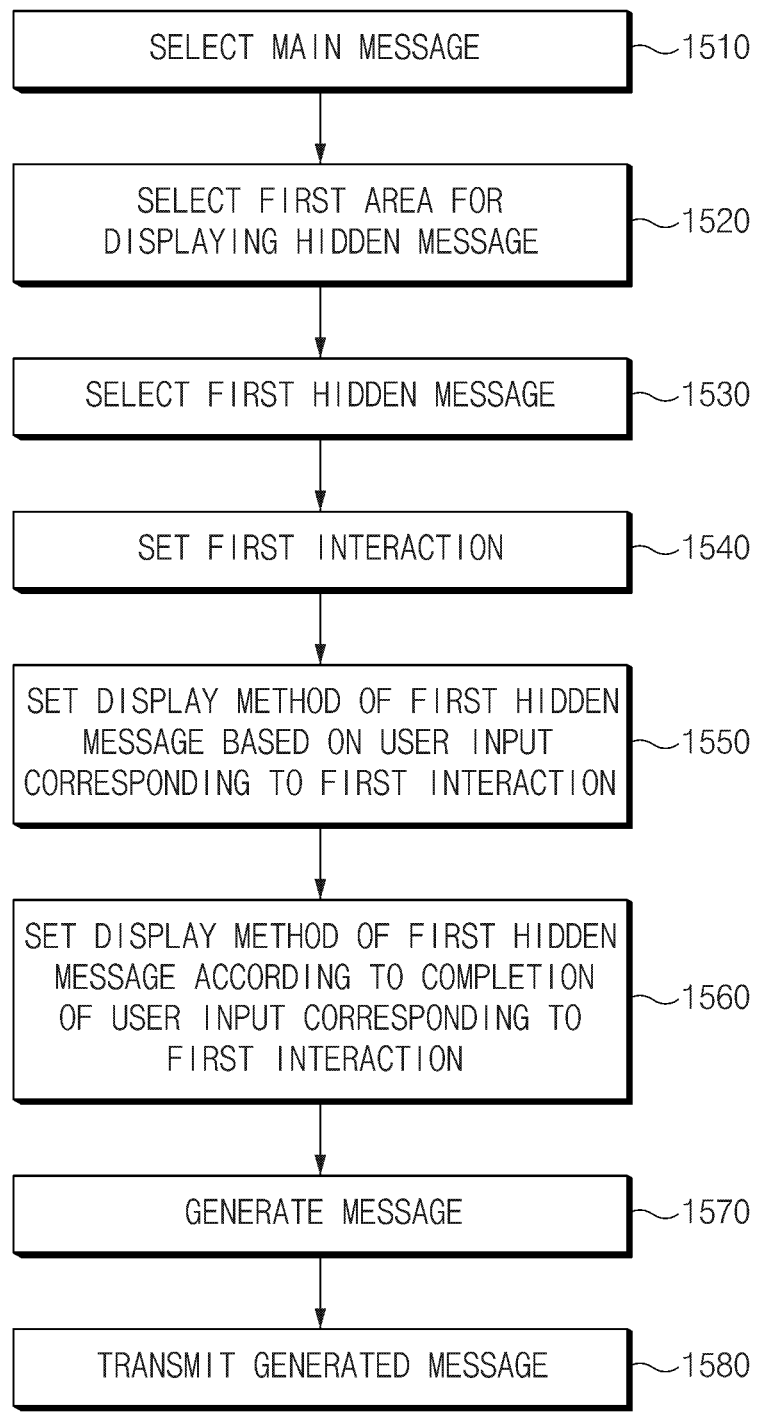
FIG. 15 is a flowchart illustrating a method of generating, by the first electronic device, a message set to display a hidden message according to completion of an interaction according to an embodiment.

FIG. 15 is a flowchart illustrating a method of generating, by the first electronic device, a message set to display a hidden message according to completion of an interaction according to an embodiment.

According to an embodiment, in operations 1510 and 1520, the first electronic device 100 (e.g., the processor 150) may select a main message and a first area, as in operations 710 and 720 of FIG. 7. According to an embodiment, in operation 1530, the first electronic device 100 may select a first hidden message, as in operation 740 of FIG. 7. According to an embodiment, in operation 1540, the first electronic device 100 may perform an operation of setting a first interaction, as in operation 730 of FIG. 7.

According to an embodiment, in operation 1550, the first electronic device 100 may set a method of displaying the first hidden message on the main message, as in operation 1135 of FIG. 11. According to an embodiment, the first electronic device 100 may display the first hidden message on the main message, based on the user input corresponding to the first interaction. For example, the first electronic device 100 may set the display method of the first hidden message, based on the holding time, the input path, and the input speed of the user input. In this example, the first hidden message may be set such that the transparency of the first hidden message depends on the holding time of the user input (e.g. shorter holding time means lower transparency). In another example, the area where the first hidden message is displayed on the main message may be changed according to the input path. In another example, the first hidden message may be set such that the video image playback speed is increased according to the input speed.

According to an embodiment, in operation 1560, the first electronic device 100 may set the display method of the first hidden message according to completion of the user input corresponding to the set first interaction. In other words, the first electronic device 100 may set the display method of the first hidden message, based on the completed user input. For example, the first electronic device 100 may set the display method of the first hidden message according to the time when the user input is completed. For example, the first hidden message may be set to remain displayed on the main message at the time when the user input is completed. In another example, the first electronic device 100 may set the display method of the first hidden message according to the input time of the completed user input. For example, the first hidden message may be set such that whether to display the first hidden message is determined based on whether the input time of the completed user input is less than or equal to a specified time.

According to an embodiment, in operation 1570, the first electronic device 100 may generate the message that includes the main message and the first hidden message. According to an embodiment, in operation 1580, the first electronic device 100 may transmit the generated message to an external device (e.g., the second electronic device 200).

Figure 16:
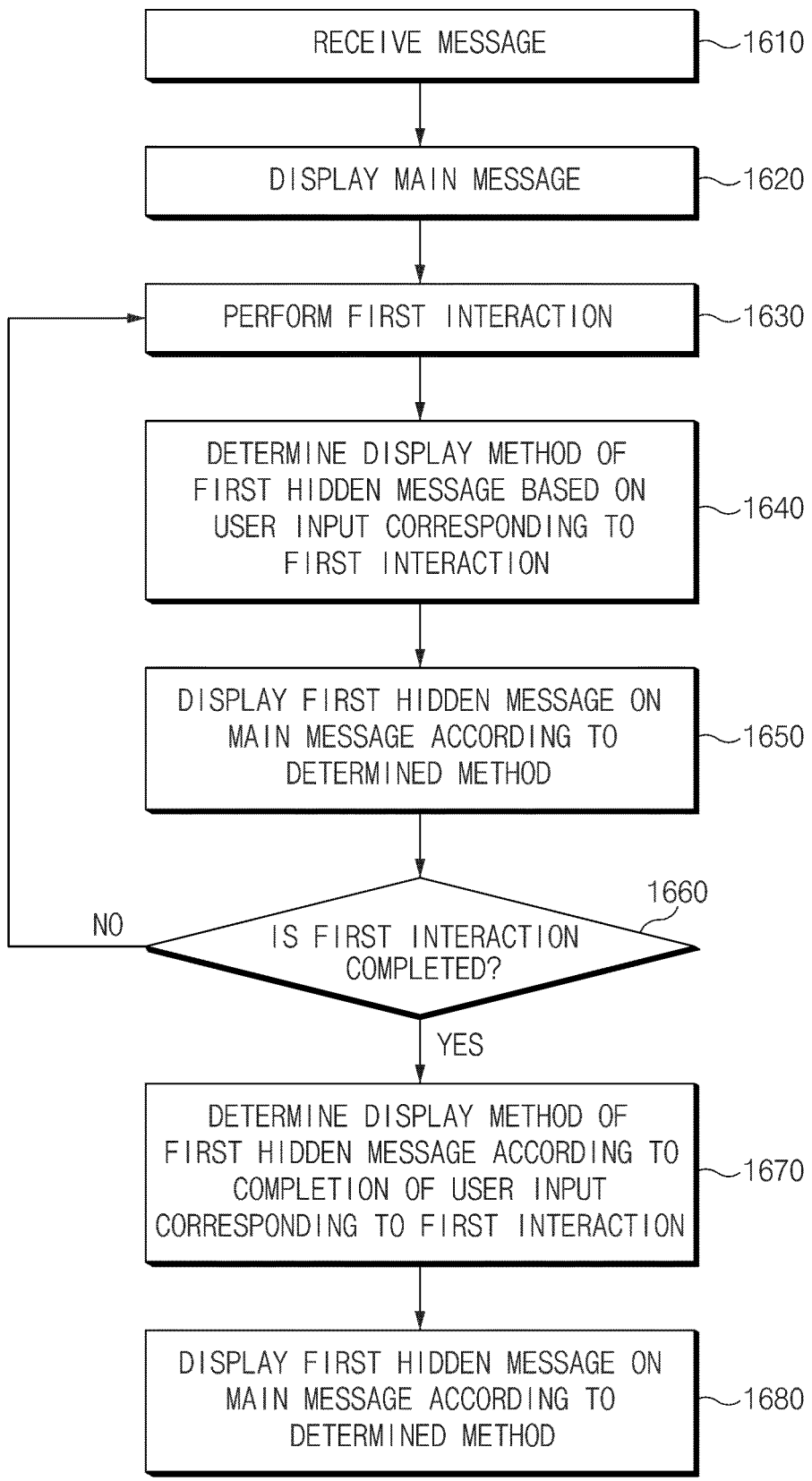
FIG. 16 is a flowchart illustrating a method of displaying, by the second electronic device, a hidden message according to completion of an interaction according to an embodiment.

FIG. 16 is a flowchart illustrating a method of displaying, by the second electronic device, a hidden message according to completion of an interaction according to an embodiment.

According to an embodiment, in operations 1610, 1620, and 1630, the second electronic device 200 (e.g., the processor 250) may receive a message that includes a main message, a first hidden message, and a second hidden message, may display the main message on the display 230, and may perform a first interaction, as in operations 910, 920, and 930 of FIG. 9.

According to an embodiment, in operation 1640, the second electronic device 200 may determine a method of displaying the first hidden message on the main message, based on the input time and the input speed of the user input corresponding to the first interaction set in the message. For example, the second electronic device 200 may determine the transparency, the display area, and the playback speed of the first hidden message, based on the holding time, the input path, and the input speed of the user input. According to an embodiment, in operation 1650, the second electronic device 200 may display the first hidden message on the main message according to the determined method.

For example, the second electronic device 200 may lower the transparency of the first hidden message (e.g., a tree image) overlaid on the main message (e.g., a window image), based on the holding time of a touch input. In another example, the second electronic device 200 may change the area where the first hidden message is displayed on the main message, based on the path of the rub input, if the rub input is the input that corresponds to the set first interaction. The area of the first hidden message that corresponds to the path of the rub input may be displayed on the main message. In another example, the second electronic device 200 may increase the playback speed of the first hidden message displayed on the main message, based on the input speed of the rub input, when the first hidden message is a video.

According to an embodiment, in operation 1660, the second electronic device 200 may determine whether the first interaction is completed. According to an embodiment, when it is determined that the first interaction is not completed, the second electronic device 200 may continually display the first hidden message corresponding to the first interaction.

According to an embodiment, when it is determined that the first interaction is completed, the second electronic device 200, in operation 1670, may determine a method of displaying the first hidden message on the main message according to the completion of the user input corresponding to the first interaction. For example, the second electronic device 200 may determine the display method of the first hidden message, based on the time when the user input is completed. In another example, the second electronic device 200 may determine whether to display the first hidden message, based on the input time of the user input. For example, whether to display the first hidden message on the main message may be determined based on whether the input time of the user input is less than or equal to a specified time. In other words, the second electronic device 200 may determine to display the first hidden message when the user input is input for the specified time or more. Alternatively, the second electronic device 200 may determine that the first hidden message is not to be displayed when the user input is input for less than the specified time. In another example, when the user input is input for the specified time or more, the second electronic device 200 may consider that the user input is completed even through the user input continues, and may determine to display the first hidden message on the main message.

According to an embodiment, in operation 1680, the second electronic device 200 may display the first hidden message on the main message according to the determined method. For example, the second electronic device 200 may allow the first hidden message to remain displayed on the main message after the user input is completed. In another example, the second electronic device 200 may display the first hidden message on the main message when the user input is input for the specified time or more.

For example, the second electronic device 200 may display the first hidden message (e.g., a tree image) on the main message (e.g., a window image) when the input time of a completed touch input (e.g., a tap input) is not less than a specified time. The first hidden message may be displayed with a transparency that depends from a property of the touch input (e.g. the input speed). Conversely, the second electronic device 200 may not display the first hidden message on the main message when the input time is less than the specified time. The second electronic device 200 may display the first hidden message on the main message with the specified transparency according to the touch input. In another example, the second electronic device 200 may display the first hidden message on the main message when the area corresponding to the path of a rub input is not less than a specified area. The area of the first hidden message that corresponds to the path of the rub input may be displayed. The second electronic device 200 may display the first hidden message on the main message when the area corresponding to the path of the rub input is less than the specified area.

Figure 17:
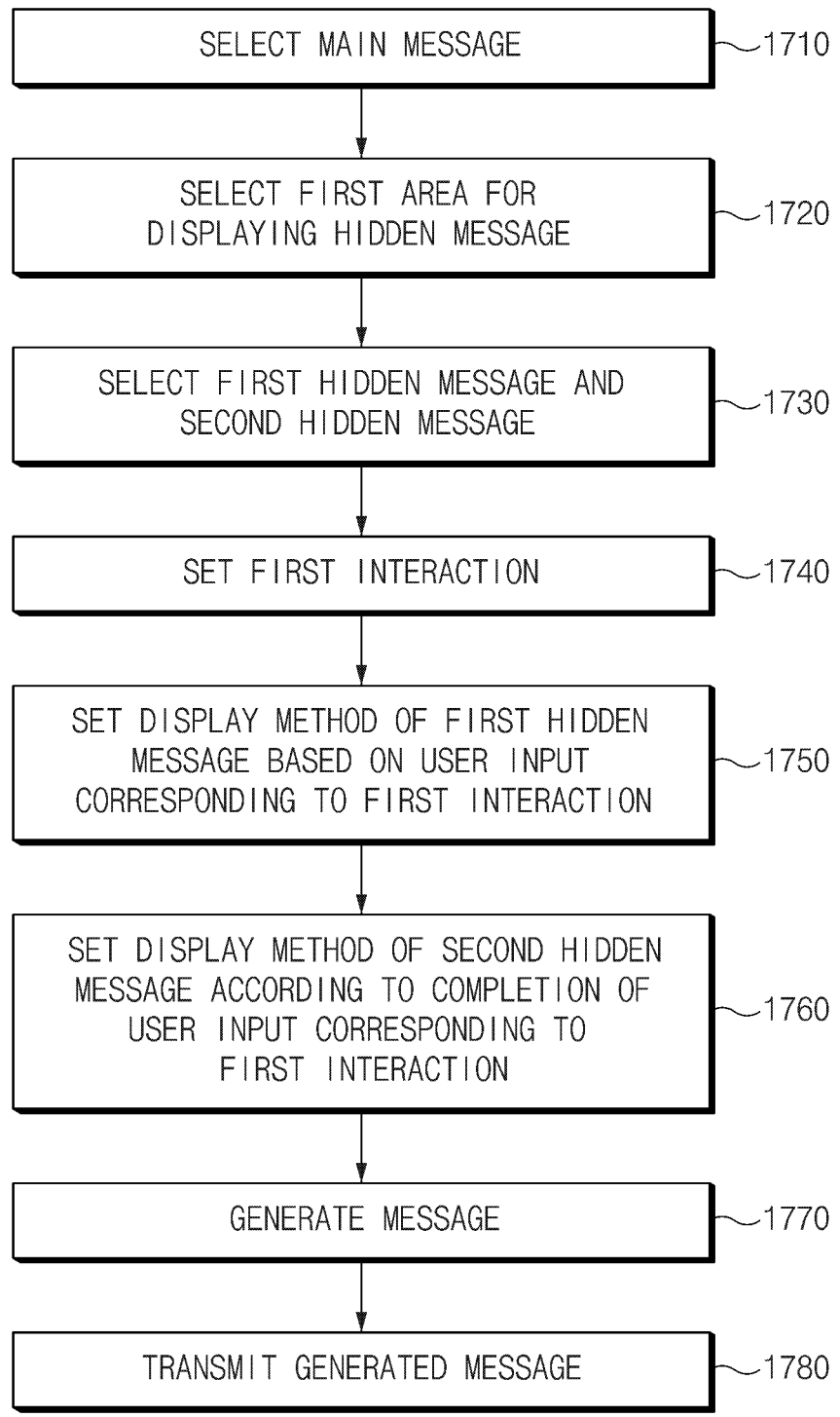
FIG. 17 is a flowchart illustrating a method of generating, by the first electronic device, a message set to display a plurality of hidden messages according to completion of an interaction according to an embodiment.

FIG. 17 is a flowchart illustrating a method of generating, by the first electronic device, a message set to display a plurality of hidden messages according to completion of an interaction according to an embodiment.

According to an embodiment, in operations 1710 and 1720, the first electronic device 100 (e.g., the processor 150) may select a main message and may select a first area, as in operations 1510 and 1520 of FIG. 15.

According to an embodiment, in operation 1730, the first electronic device 100 may select a first hidden message and a second hidden message. For example, the first electronic device 100 may receive user inputs for selecting the first and second hidden messages, respectively.

According to an embodiment, in operations 1740 and 1750, the first electronic device 100 may execute an operation of setting a first interaction and may set a method of displaying the first hidden message, as in operations 1540 and 1550 of FIG. 15. For example, the first interaction may be set to display the first hidden message and the second hidden message on the main message.

According to an embodiment, in operation 1760, the first electronic device 100 may determine a display method of the second hidden message according to completion of the user input corresponding to the first interaction. For example, the method in which the second hidden message is displayed on the main message may be determined based on the time when the user input is completed. In another example, the display method of the second hidden message displayed on the main message may be determined based on the input time of the completed user input.

According to an embodiment, in operation 1770, the first electronic device 100 may generate the message that includes the main message, the first hidden message, and the second hidden message. According to an embodiment, in operation 1780, the first electronic device 100 may transmit the generated message to an external device (e.g., the second electronic device 200).

Figure 18:
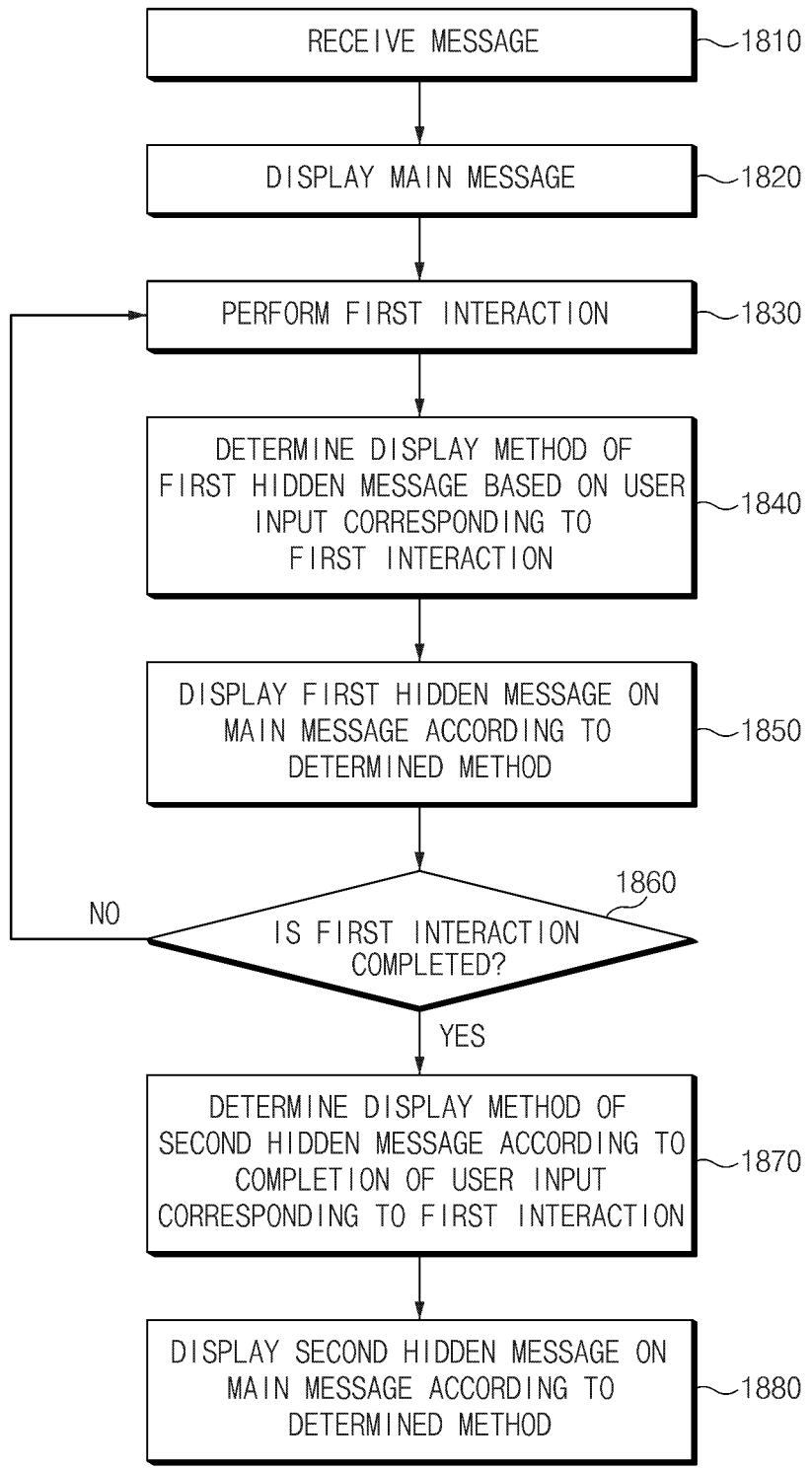
FIG. 18 is a flowchart illustrating a method of displaying a first hidden message and a second hidden message by the second electronic device according to an embodiment.

FIG. 18 is a flowchart illustrating a method of displaying a first hidden message and a second hidden message by the second electronic device according to an embodiment.

According to an embodiment, in operations 1810, 1820, 1830, 1840, 1850, and 1860, the second electronic device 200 (e.g., the processor 250) may receive a message that includes a main message, a first hidden message, and a second hidden message, may display the main message on the display 230, may perform a first interaction, may determine a method of displaying the first hidden message, may display the first hidden message according to the determined method, and may determine whether the first interaction is completed, as in operations 1610, 1620, 1630, 1640, 1650, and 1660 of FIG. 16. According to an embodiment, when it is determined that the first interaction is not completed, the second electronic device 200 may continually display the first hidden message corresponding to the first interaction.

According to an embodiment, when it is determined that the first interaction is completed, the second electronic device 200, in operation 1870, may determine a method of displaying the second hidden message on the main message according to the completion of the user input corresponding to the first interaction. For example, the second electronic device 200 may determine the method of displaying the second hidden message based on the time when the user input is completed. In another example, the second electronic device 200 may determine whether to display the second hidden message based on the input time of the user input. In another example, when the user input is input for a specified time or more, the second electronic device 200 may consider that the user input is completed even through the user input continues, and may determine to display the second hidden message on the main message.

According to an embodiment, in operation 1880, the second electronic device 200 may display the second hidden message on the main message according to the determined method. For example, the second electronic device 200 may display the second hidden message in the same manner as the first hidden message when the user input is completed. In another example, the second electronic device 200 may display the second hidden message on the main message when the user input is input for the specified time or more.

For example, the second electronic device 200 may display the second hidden message (e.g., a beach image) instead of the first hidden message (e.g., a tree image) overlaid on the main message (e.g., a window image) when the input time of the completed touch input (e.g., a tap input) is not less than a specified time. In this example, the second hidden message may be displayed with a transparency similar to that of the first hidden message, which in turn was displayed with a transparency that was set depending on one or more aspects of the touch input (e.g. the input speed). Conversely, the second electronic device 200 may continue to display the first hidden message on the main message with the specified transparency when the input time is not greater than the specified time. In another example, the second electronic device 200 may display the second hidden message on the main message instead of the first hidden message when the area corresponding to the path of a rub input is not less than a specified area. In displaying the second hidden message, the area of the second hidden message may be similar to the area of the first hidden message. The second electronic device 200 may not display the second hidden message on the main message when the input area is less than the specified area.

Figure 19:
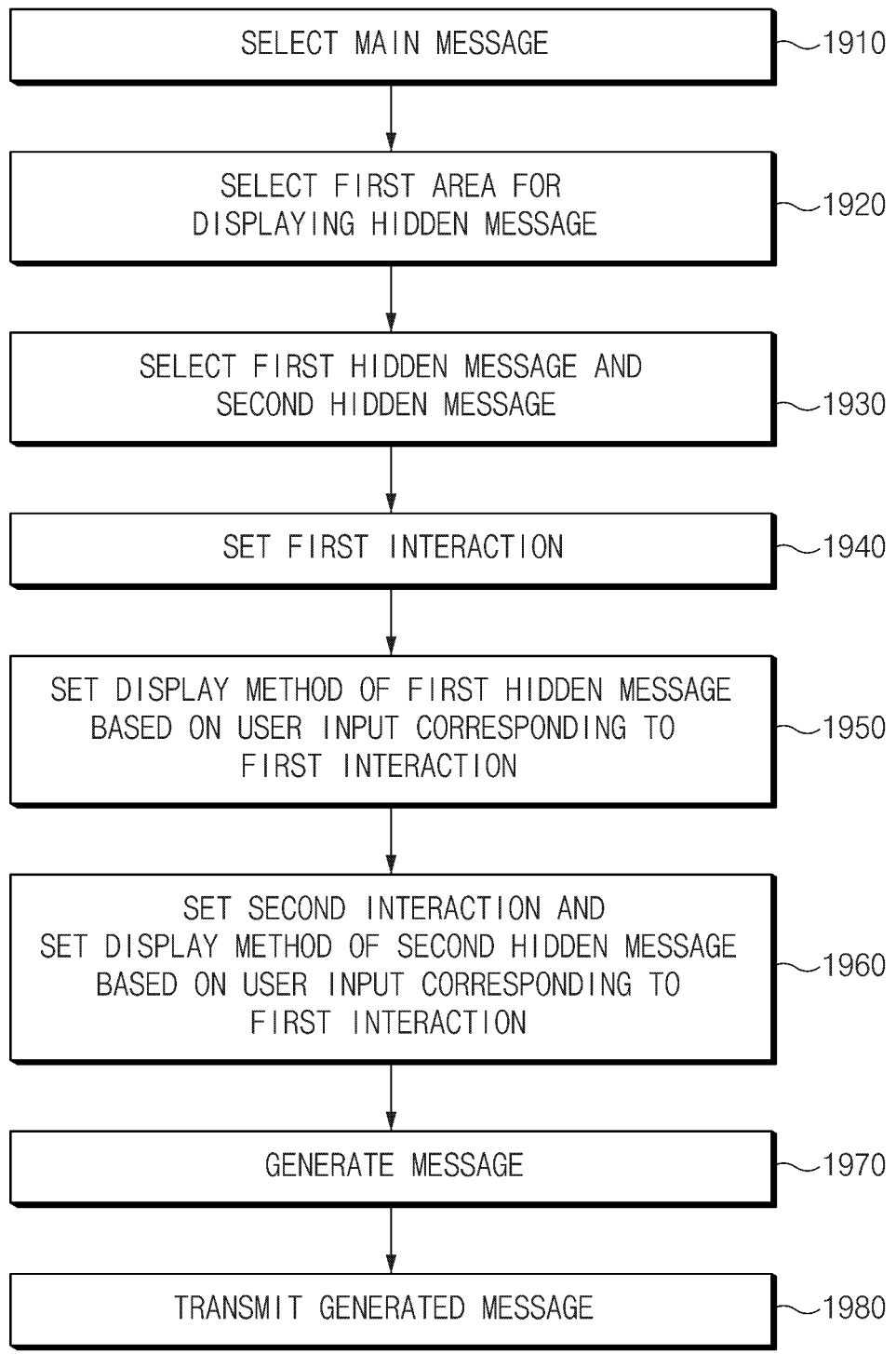
FIG. 19 is a flowchart illustrating a method of generating, by the first electronic device, a message set to display a plurality of hidden messages according to the performance of an interaction according to an embodiment.

FIG. 19 is a flowchart illustrating a method of generating, by the first electronic device, a message set to display a plurality of hidden messages according to the performance of an interaction according to an embodiment.

According to an embodiment, in operations 1910, 1920, 1930, 1940, and 1950, the first electronic device 100 (e.g., the processor 150) may select a main message, may select a first area, may receive user inputs for selecting first and second hidden messages, may execute an operation of setting a first interaction, and may set a method of displaying the first hidden message, as in operations 1710, 1720, 1730, 1740, and 1750 of FIG. 17.

According to an embodiment, in operation 1960, the first electronic device 100 may execute an operation of setting a second interaction. Furthermore, the first electronic device 100 may set a display method of the second hidden message, based on a user input corresponding to the set first interaction. For example, the first electronic device 100 may determine the display method of the second hidden message displayed on the main message, based on the holding time and the input speed of the user input corresponding to the first interaction. For example, the second hidden message may be displayed in the same manner (e.g., with the same transparency and the same playback speed) as the first hidden message. In other words, the second hidden message may be displayed based on the state in which the first hidden message is displayed.

According to an embodiment, in operation 1970, the first electronic device 100 may generate a message that includes the main message, the first hidden message, and the second hidden message. According to an embodiment, in operation 1980, the first electronic device 100 may transmit the generated message to an external device (e.g., the second electronic device 200).

Figure 20:
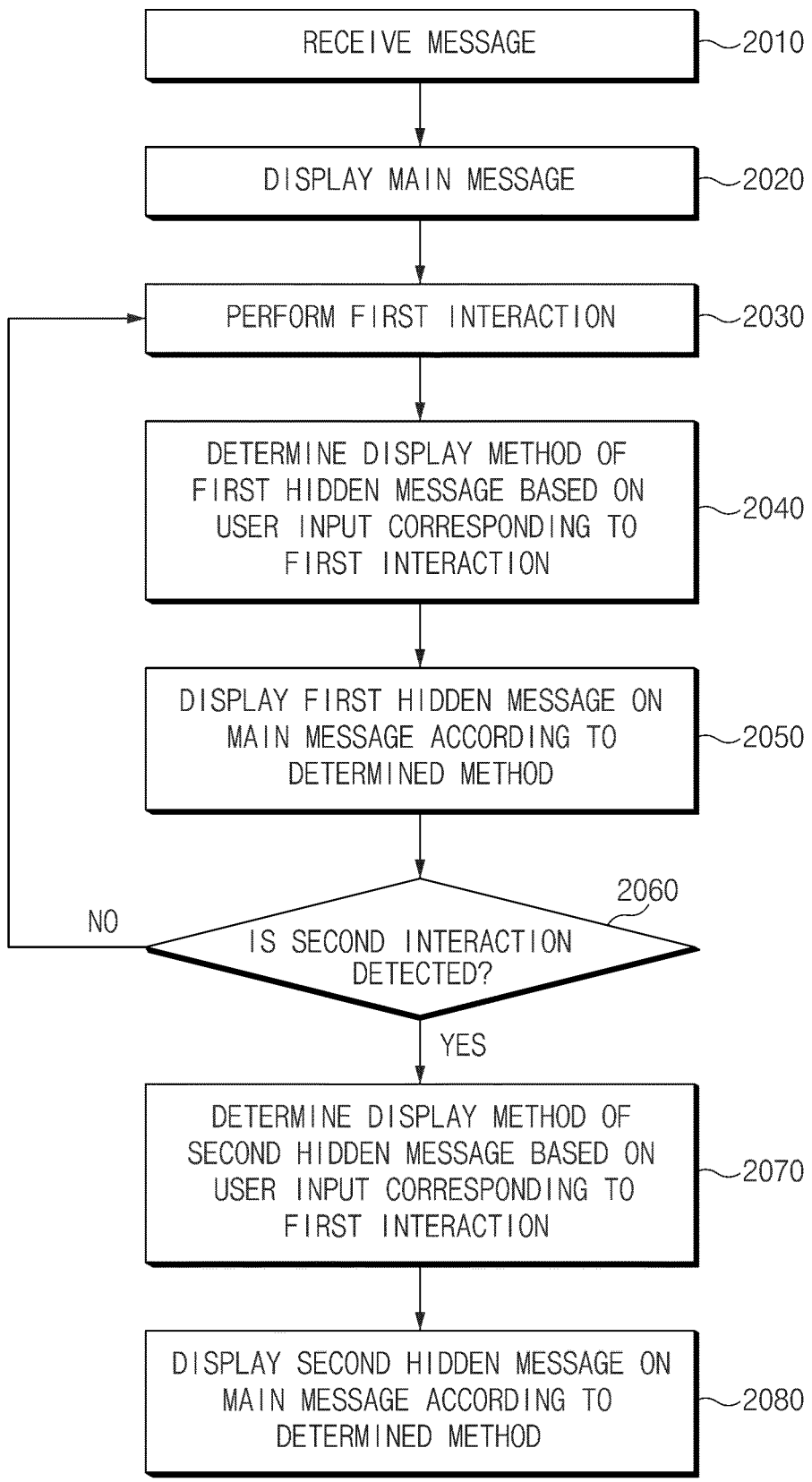
FIG. 20 is a flowchart illustrating a method of displaying, by the second electronic device, a plurality of hidden messages according to the performance of an interaction according to an embodiment.

FIG. 20 is a flowchart illustrating a method of displaying, by the second electronic device, a plurality of hidden messages according to the performance of an interaction according to an embodiment.

According to an embodiment, in operations 2010, 2020, 2030, 2040, and 2050, the second electronic device 200 (e.g., the processor 250) may receive a message that includes a main message, a first hidden message, and a second hidden message, may display the main message on the display 230, may perform a first interaction, may determine a method of displaying the first hidden message, and may display the first hidden message according to the determined method, as in operations 1810, 1820, 1830, 1840, and 1850 of FIG. 18.

According to an embodiment, in operation 2060, the second electronic device 200 may determine whether a second interaction is detected. For example, the second electronic device 200 may determine whether a user input corresponding to the second interaction is received. According to an embodiment, when it is determined that the second interaction is not detected, the second electronic device 200 may continually perform the first interaction. For example, the second electronic device 200 may continually display the first hidden message corresponding to the first interaction.

According to an embodiment, when it is determined in operation 2060 that the second interaction is detected, the second electronic device 200, in operation 2070, may determine a method of displaying the second hidden message on the main message, based on a user input corresponding to the first interaction. For example, the second electronic device 200 may display the second hidden message on the main message according to the display method of the first hidden message. According to an embodiment, in operation 2080, the second electronic device 200 may display the second hidden message on the main message according to the determined method.

For example, when receiving a rub input (second interaction) after receiving a tap input (first interaction), the second electronic device 200 may display the second hidden message (e.g., a beach image) on the main message with a specified transparency according to the tap input. The second message may replace the first hidden message (e.g., a tree image) displayed on the main message (e.g., a window image). In another example, when receiving a tap input (second interaction) after receiving a rub input (first interaction), the second electronic device 200 may display, on the main message, the second hidden message in an area that corresponds to the path of the rub input The second message may replace the first hidden message in the same area. In another example, when receiving a rub input after receiving a tap input, the second electronic device 200 may display the second hidden message (e.g., a beach video) on the main message with a specified playback speed according to the tap input.

Figure 21:
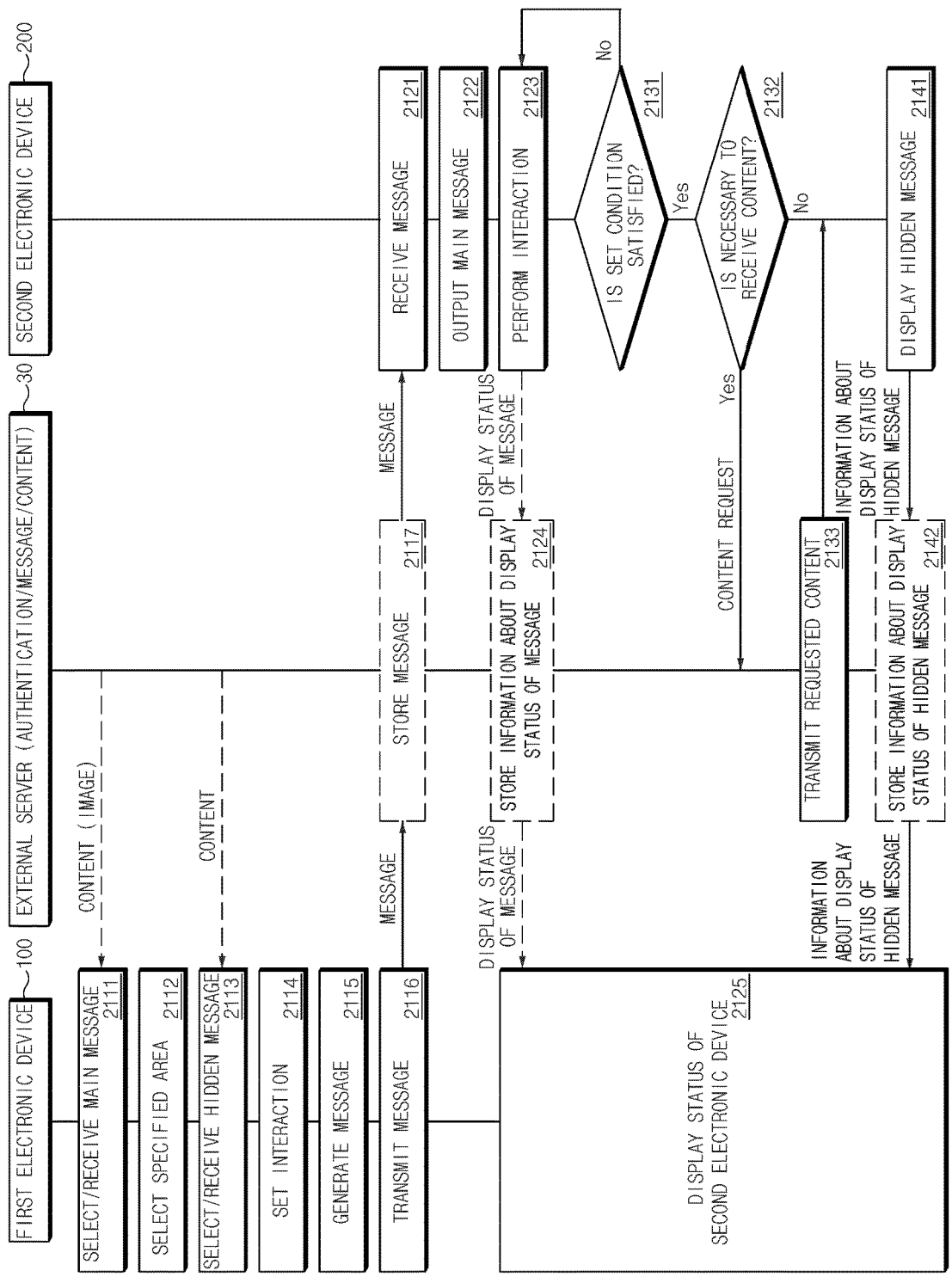
FIG. 21 is a sequence diagram illustrating a method of transmitting a message to the second electronic device through an external server by the first electronic device according to an embodiment.

FIG. 21 is a sequence diagram illustrating a method of transmitting a message to the second electronic device through the external server by the first electronic device according to an embodiment.

Referring to FIG. 21, the first electronic device 100 may transmit a message to the second electronic device 200 through the external server 30 that provides a user authentication service, a message service, and a content provision service. Operations shown by dotted lines in FIG. 21 may be operations associated with the external server 30.

According to an embodiment, in operation 2111, the first electronic device 100 may receive a user input for selecting a main message. According to an embodiment, in operation 2111, the first electronic device 100 may receive content (e.g. multimedia content) corresponding to the selected main message from the external server 30. The content may include, for example, an image or a video image.

According to an embodiment, in operation 2112, the first electronic device 100 may receive a user input to select a specified first area for displaying a hidden message.

According to an embodiment, in operation 2113, the first electronic device 100 may receive a user input for selecting a hidden message. For example, the first electronic device 100 may receive a user input for selecting a hidden message that includes content stored in the external server 30. According to an embodiment, the first electronic device 100 may receive content corresponding to the selected hidden message from the external server 30 and may output the received content. For example, the first electronic device 100 may output the hidden message by displaying the hidden message, which includes the content received from the external server 30, over the content included in the main message.

According to an embodiment, in operation 2114, the first electronic device 100 may set an interaction. For example, the first electronic device 100 may set a user input corresponding to the set interaction and a second area to which the user input may be input. The second area may be the same as, for example, the first area where the hidden message is displayed. According to an embodiment, the first electronic device 100 may set a method of displaying the hidden message on the main message. In another example, the first electronic device 100 may set a condition for displaying the hidden message on the main message. The set condition may be, for example, whether the user of the second electronic device 200 is authorized to view the hidden message. In other words, the hidden message may be opened to (or shared with) a specified user.

According to an embodiment, in operation 2115, the first electronic device 100 may generate a message that includes the main message and the hidden message. For example, the first electronic device 100 may include information about the hidden message in the generated message. The generated message may include additional information such as information about the method of displaying the hidden message and information restricting who can view the hidden message. According to an embodiment, in operation 2116, the first electronic device 100 may transmit the generated message to the external server 30.

According to an embodiment, in operation 2117, the external server 30 may receive the message including the main message and the hidden message from the first electronic device 100 and may store the received message in a database. According to an embodiment, the external server 30 may transmit the received message to the second electronic device 200 without first storing the message.

According to an embodiment, in operation 2121, the second electronic device 200 may receive the message from the external server 30. According to an embodiment, in operation 2122, the second electronic device 200 may output the main message included in the received message.

According to an embodiment, in operation 2123, the second electronic device 200 may perform the interaction set in the message. According to an embodiment, the second electronic device 200 may transmit, to the external server 30, information about the status of the message and the status of the executed interaction. For example, the second electronic device 200 may transmit, to the external server 30, whether the hidden message is to be displayed on the main message, i.e. whether the user input from the user of the second electronic device agrees with the input information of the interaction.

According to an embodiment, in operation 2123, the second electronic device 200 may transmit, to the external server 30, information about the status of the user input corresponding to the interaction that is received after the display of the message. For example, depending on whether the received user input agrees with the user input corresponding to the interaction, the second electronic device 200 may transmit, to the external server 30, information about at least one of whether the user input occurred, a success or failure, and the type of the user input.

According to an embodiment, in operation 2124, the external server 30 may receive the information about the display status of the message from the second electronic device 200 and may store the received information in the database. According to an embodiment, the external server 30 may transmit the received information to the first electronic device 100.

According to an embodiment, in operation 2125, the first electronic device 100 may receive the information about the output status of the message and may display the received information on the display 130.

According to an embodiment, in operation 2131, the second electronic device 200 may determine the condition set in the received message. For example, the second electronic device 200 may perform user authentication according to a user condition set in the message (e.g., whether the phone number specified in the message agrees with the phone number of the second electronic device 200 or whether the user is authorized). The user may be authenticated using a biometric authentication based service. According to an embodiment, when the set condition is not satisfied, the second electronic device 200 may return to operation 2123.

According to an embodiment, when it is determined in operation 2131 that the set condition is satisfied, the second electronic device 200, in operation 2132, may determine whether it is necessary to receive content corresponding to the hidden message from the external server 30. According to an embodiment, when it is determined that it is necessary to receive the content, the second electronic device 200 may transmit a request for the content to the external server 30. According to an embodiment, in operation 2133, the external server 30 may transmit the content to the second electronic device 200.

According to an embodiment, when it is determined in operation 2132 that it is not necessary to receive content corresponding to the hidden message, the second electronic device 200, in operation 2141, may perform an operation of selecting the hidden message stored in the memory 240 of the second electronic device 200 and may output the hidden message on the main message. According to an embodiment, the second electronic device 200 may transmit information about the output status of the hidden message to the external server 30 after display of the hidden message.

According to an embodiment, in operation 2142, the external server 30 may receive the information about the output status of the hidden message and may store the received information in the database. According to an embodiment, the external server 30 may transmit the received information to the first electronic device 100.

According to an embodiment, in operation 2125, the first electronic device 100 may receive the information about the output status of the hidden message and may display the received information on the display 130.

According to an embodiment, the external server 30 may manage the messages transmitted and received by the first and second electronic devices 100 and 200, and may provide necessary content to the first and second electronic devices 100 and 200. According to an embodiment, the external server 30 may be implemented with a plurality of servers for performing the respective functions.

Figure 22:
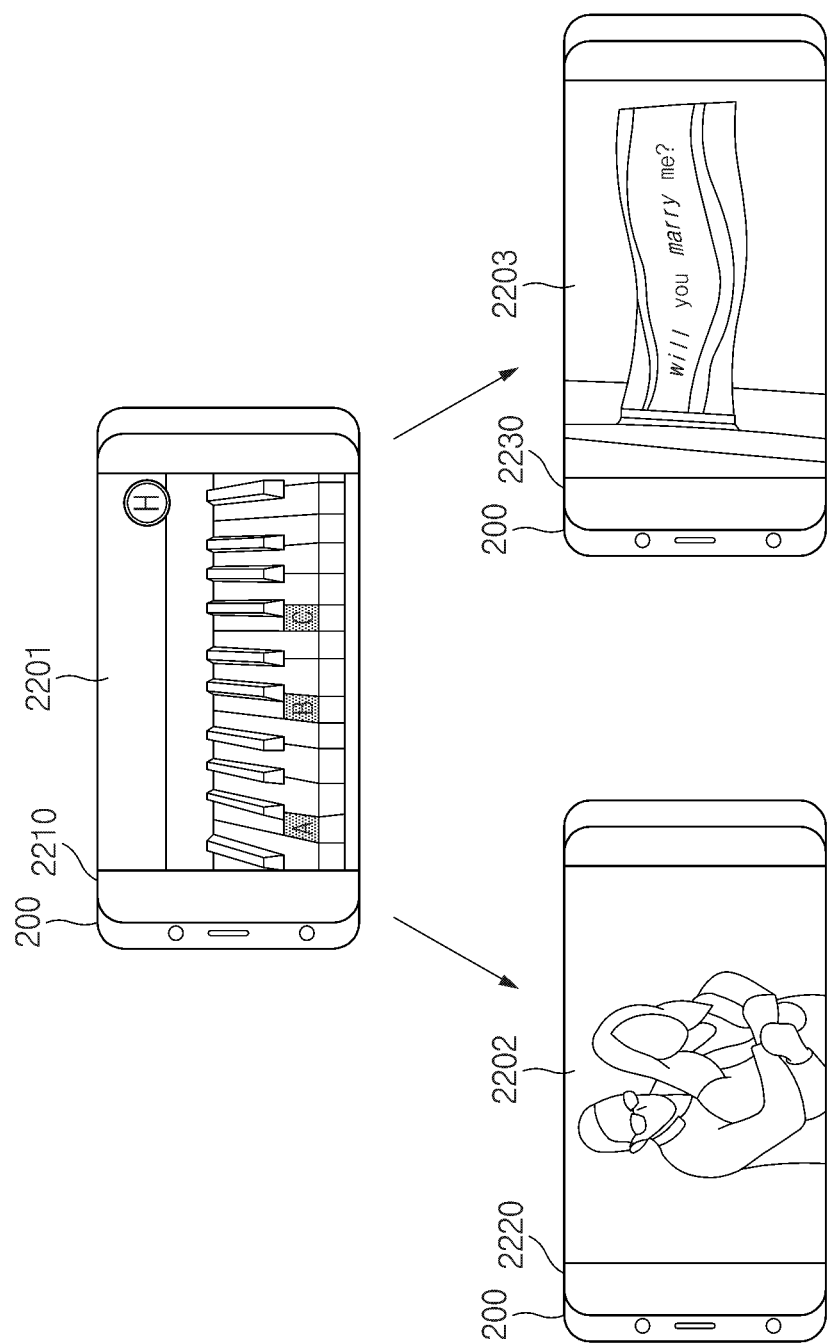
FIG. 22 are views illustrating screens on which the second electronic device performs an interaction based on user inputs of a specified sequence according to an embodiment.

FIG. 22 are views illustrating screens on which the second electronic device performs an interaction based on user inputs of a specified sequence according to an embodiment.

Referring to FIG. 22, the first electronic device 100 may generate a message having an interaction for receiving user inputs in a specified sequence and in a plurality of areas and may transmit the generated message to the second electronic device 200.

According to an embodiment, on screen 2210, the second electronic device 200 may receive, from the first electronic device 100, a message that includes a main message 2201, a first hidden message 2202, and a second hidden message 2203. The message may include, for example, a first area A, a second area B, and a third area C of the main message for receiving user inputs corresponding to the interaction. Furthermore, the message may have an interaction for receiving user inputs (e.g., a tap input) according to a specified sequence (e.g., B-C-A) through the first area A, the second area B, and the third area C. According to an embodiment, the second electronic device 200 may output the main message 2201 included in the received message. For example, the second electronic device 200 may display an image (e.g., a piano image) included in the main message 2201 on the display 230. According to an embodiment, the second electronic device 200 may perform the interaction for receiving user inputs through the plurality of areas. For example, the second electronic device 200 may receive user inputs (e.g., B-C-A) according to the specified sequence. In another example, the second electronic device 200 may receive user inputs (e.g., A-B-C, B-A-C, or the like) of different sequences.

According to an embodiment, in the case where the second electronic device 200 receives user inputs according to the specified sequence on screen 2210, the second electronic device 200 may display the first hidden message 2202 on the main message 2201 on screen 2220. For example, the second electronic device 200 may display an image (e.g., an image of people) included in the first hidden message 2202 on the display 230 when user inputs of a specific sequence (e.g., B-C-A) is received.

According to an embodiment, in the case where the second electronic device 200 receives user inputs of a different sequence on screen 2210, the second electronic device 200 may display the second hidden message 2203 on the main message 2201 on screen 2230. For example, the second electronic device 200 may display an image (e.g., a marriage proposal) included in the second hidden message 2203 on the display 230 when user inputs of a different sequence (e.g., A-B-C) is received.

Accordingly, the user may set various user inputs using a plurality of areas of the main message and may set various user inputs of various sequences.

Figure 23:
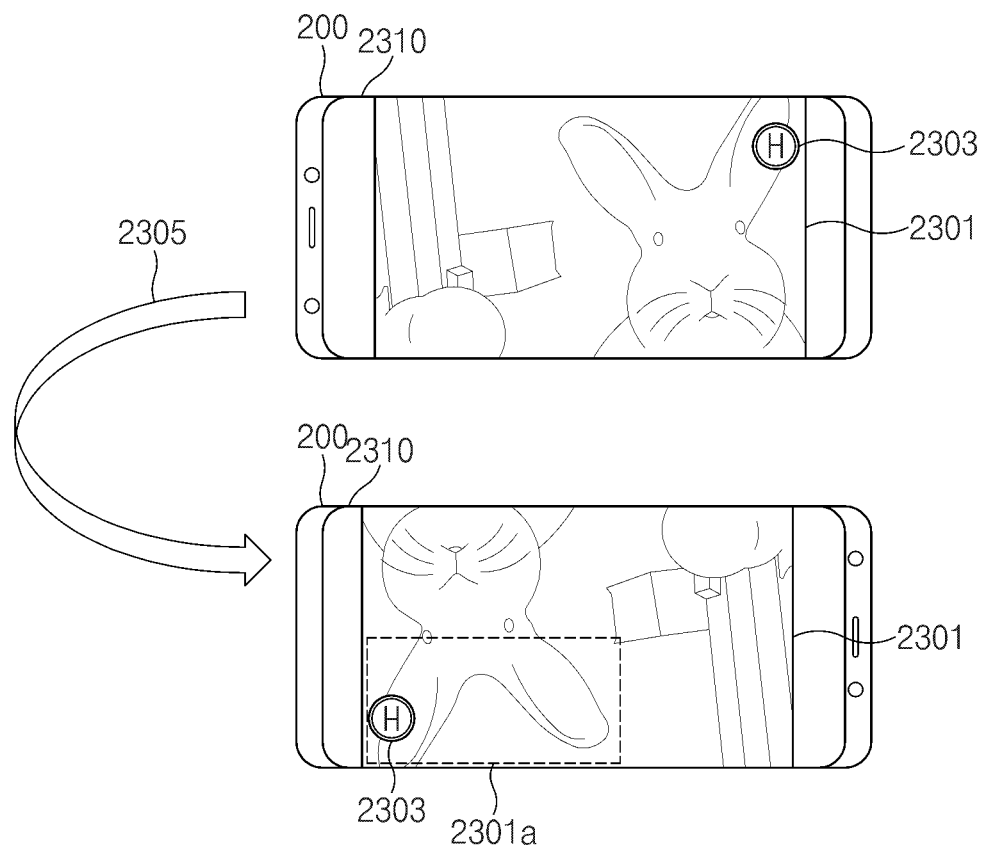
FIG. 23 are views illustrating screens on which the second electronic device provides information about an interaction according to an embodiment.

FIG. 23 are views illustrating screens on which the second electronic device provides information about an interaction according to an embodiment.

Referring to FIG. 23, the second electronic device 200, when detecting a specified motion, may provide information about the interaction set in the message to the user. The second electronic device 200 may detect the specified motion through a plurality of sensors. The plurality of sensors may include, for example, an acceleration sensor, a gyro sensor, and a motion sensor for detecting the user's motion. For example, the specified motion may be at least one of a tilting motion, a shaking motion, and movement of the electronic device to be in proximity to a body, such as the user's body.

According to an embodiment, on screen 2310, the second electronic device 200 may receive a message having an interaction for displaying a hidden message from an external electronic device (e.g., the first electronic device 100). According to an embodiment, the second electronic device 200 may output a main message 2301 included in the received message. For example, the second electronic device 200 may display an image (e.g., a rabbit image) included in the main message 2301 on the display 230. According to an embodiment, the second electronic device 200 may display an indicator 2303 indicating the hidden message on the display 230. The second electronic device 200 may fail to receive a user input corresponding to the set interaction. For example, the second electronic device 200 may receive a user input that does not match or agree with the user input corresponding to the set interaction. In another example, the second electronic device 200 may receive a user input through a different area rather than a specified area 2301a of the main message 2301.

According to an embodiment, on screen 2320, the second electronic device 200, when detecting the specified motion, may provide the information about the interaction set in the message to the user. For example, when detecting an operation 2305 of rotating the second electronic device 200, the second electronic device 200 may display the area specified in the interaction. In another example, when detecting at least one of an operation of tilting the second electronic device 200, an operation of shaking the second electronic device 200, and an operation of bringing the second electronic device 200 to a close to a body, the second electronic device 200 may display the area specified in the interaction. The area specified in the interaction may be displayed by, for example, at least one of displaying a boundary, displaying an image effect, displaying a logo, and displaying text.

According to another embodiment, the second electronic device 200, when receiving another specified user input, may provide the information about the interaction set in the message to the user. For example, when receiving an input (e.g., a tap input) selecting the indicator 2303 indicating the hidden message, the second electronic device 200 may provide the information about the interaction to the user.

Accordingly, the user may obtain a hint on the interaction, thereby easily displaying the hidden message on the display 230.

Figure 24:
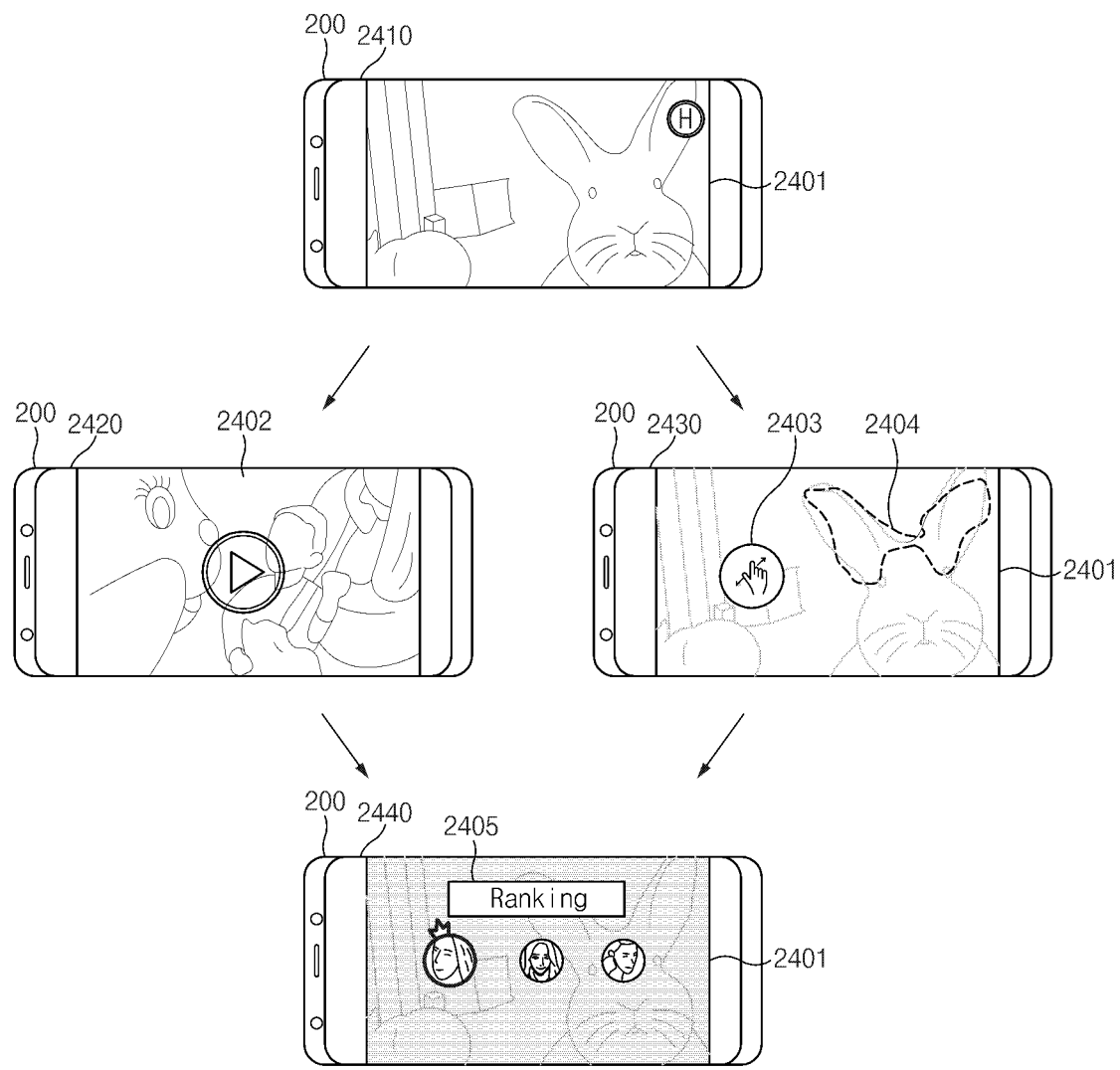
FIG. 24 are views illustrating screens on which the second electronic device provides a hidden message included in a message to a user based on a specified number of times a user input is entered according to an embodiment.

FIG. 24 are views illustrating screens on which the second electronic device provides a hidden message included in a message to a user based on a specified number of times a user input is entered according to an embodiment.

According to an embodiment, on screen 2410, the second electronic device 200 may receive a message including a main message 2401 and a hidden message 2402 from an external electronic device (e.g., the first electronic device 100). According to an embodiment, the second electronic device 200 may output the main message 2401 included in the received message. For example, the second electronic device 200 may display an image (e.g., a rabbit image) included in the main message 2401 on the display 230.

According to an embodiment, on screen 2420, the second electronic device 200 may display the hidden message 2402 on the main message 2401 after receiving a user input corresponding to the interaction set in the message, if the user input is repeated a specified number of times. For example, when the user input corresponding to the set interaction is repeated five times, the second electronic device 200 may display an image (e.g., a video image) included in the hidden message 2402 on the display 230.

According to an embodiment, on screen 2430, the second electronic device 200 may provide information about the set interaction to the user if the user fails to input the user input the specified number of times. For example, if the user input corresponding to the set interaction is received for less than five times, the second electronic device 200 may provide, to the user, the indicator 2403 of the user input and an area 2404 for receiving the user input. If the user performs the user input indicated by the indicator 2403 in the area 2404, the hidden message may be displayed.

According to an embodiment, on screen 2440, the second electronic device 200 may provide, to the user, a result obtained by comparing states of a plurality of electronic devices that received the message. For example, the second electronic device 200 may provide, to the user, ranking information 2405 showing users who have successfully caused their electronic devices to output the hidden message.

Accordingly, the user may obtain hints associated with the interaction for displaying the hidden message. In addition, unlocking the display of the hidden message may be organized as a game among users.

According to the embodiments described above with reference to FIGS. 1 to 24, the electronic devices 100 and 200 may transmit or receive a message for providing a hidden message to the user. The hidden message may be displayed after receiving a user input corresponding to a set interaction. Accordingly, a richer user experience (UX) may be implemented.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Figure 25:
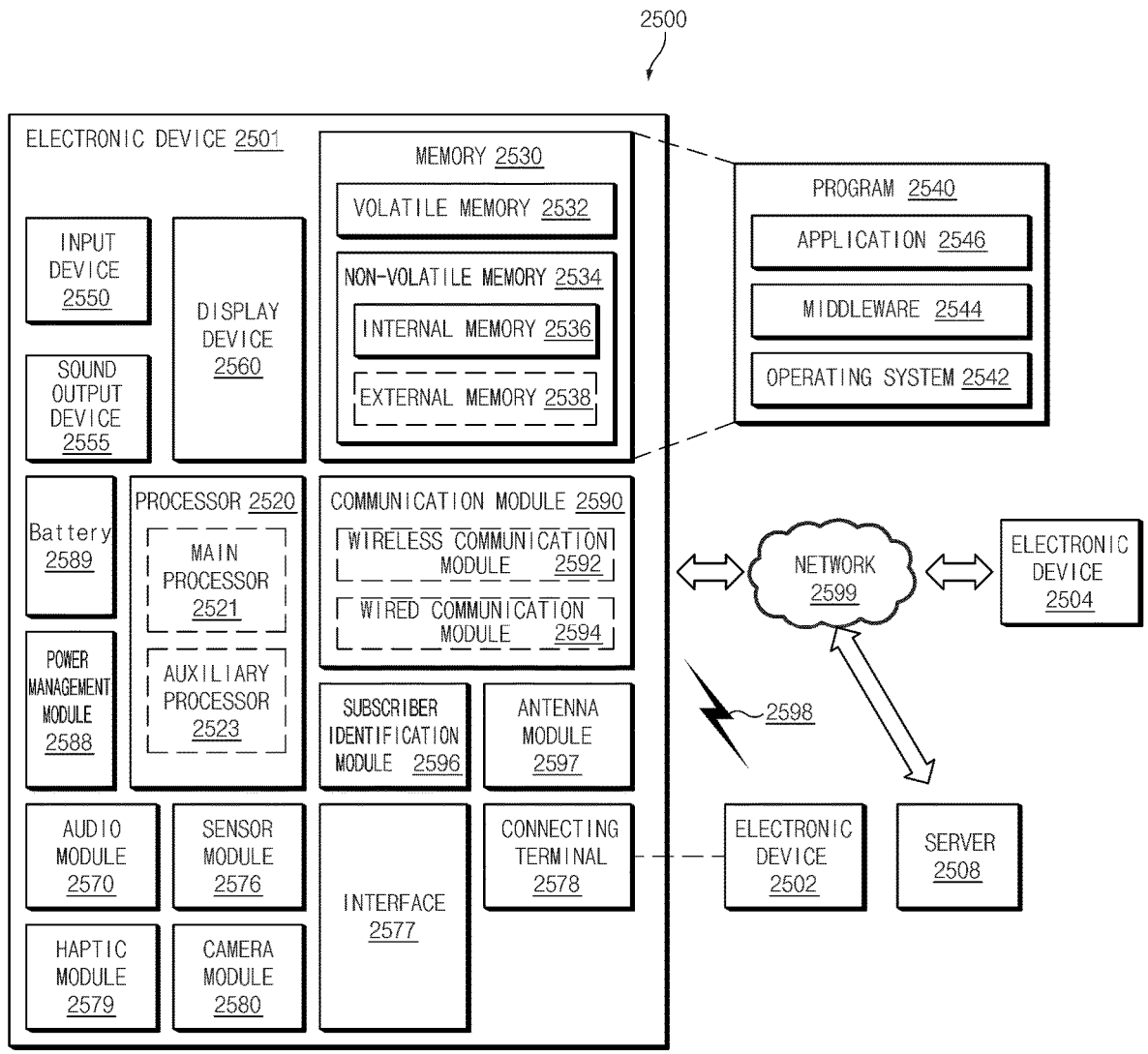
FIG. 25 is a block diagram illustrating an electronic device 2501 in a network environment 2500 according to various embodiments.

FIG. 25 is a block diagram illustrating an electronic device 2501 in a network environment 2500 according to various embodiments. Referring to FIG. 25, the electronic device 2501 in the network environment 2500 may communicate with an electronic device 2502 via a first network 2598 (e.g., a short-range wireless communication network), or an electronic device 2504 or a server 2508 via a second network 2599 (e.g., a long-range wireless communication network). According to an embodiment, the electronic device 2501 may communicate with the electronic device 2504 via the server 2508. According to an embodiment, the electronic device 2501 may include a processor 2520, memory 2530, an input device 2550, a sound output device 2555, a display device 2560, an audio module 2570, a sensor module 2576, an interface 2577, a haptic module 2579, a camera module 2580, a power management module 2588, a battery 2589, a communication module 2590, a subscriber identification module (SIM) 2596, or an antenna module 2597. In some embodiments, at least one (e.g., the display device 2560 or the camera module 2580) of the components may be omitted from the electronic device 2501, or one or more other components may be added in the electronic device 2501. In some embodiments, some of the components may be implemented as single integrated circuitry. For example, the sensor module 2576 (e.g., a fingerprint sensor, an iris sensor, or an illuminance sensor) may be implemented as embedded in the display device 2560 (e.g., a display).

The processor 2520 may execute, for example, software (e.g., a program 2540) to control at least one other component (e.g., a hardware or software component) of the electronic device 2501 coupled with the processor 2520, and may perform various data processing or computation. According to one embodiment, as at least part of the data processing or computation, the processor 2520 may load a command or data received from another component (e.g., the sensor module 2576 or the communication module 2590) in volatile memory 2532, process the command or the data stored in the volatile memory 2532, and store resulting data in non-volatile memory 2534. According to an embodiment, the processor 2520 may include a main processor 2521 (e.g., a central processing unit (CPU) or an application processor (AP)), and an auxiliary processor 2523 (e.g., a graphics processing unit (GPU), an image signal processor (ISP), a sensor hub processor, or a communication processor (CP)) that is operable independently from, or in conjunction with, the main processor 2521. Additionally or alternatively, the auxiliary processor 2523 may be adapted to consume less power than the main processor 2521, or to be specific to a specified function. The auxiliary processor 2523 may be implemented as separate from, or as part of the main processor 2521.

The auxiliary processor 2523 may control at least some of functions or states related to at least one component (e.g., the display device 2560, the sensor module 2576, or the communication module 2590) among the components of the electronic device 2501, instead of the main processor 2521 while the main processor 2521 is in an inactive (e.g., sleep) state, or together with the main processor 2521 while the main processor 2521 is in an active state (e.g., executing an application). According to an embodiment, the auxiliary processor 2523 (e.g., an image signal processor or a communication processor) may be implemented as part of another component (e.g., the camera module 2580 or the communication module 2590) functionally related to the auxiliary processor 2523.

The memory 2530 may store various data used by at least one component (e.g., the processor 2520 or the sensor module 2576) of the electronic device 2501. The various data may include, for example, software (e.g., the program 2540) and input data or output data for a command related thereto. The memory 2530 may include the volatile memory 2532 or the non-volatile memory 2534.

The program 2540 may be stored in the memory 2530 as software, and may include, for example, an operating system (OS) 2542, middleware 2544, or an application 2546.

The input device 2550 may receive a command or data to be used by other component (e.g., the processor 2520) of the electronic device 2501, from the outside (e.g., a user) of the electronic device 2501. The input device 2550 may include, for example, a microphone, a mouse, or a keyboard.

The sound output device 2555 may output sound signals to the outside of the electronic device 2501. The sound output device 2555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 2560 may visually provide information to the outside (e.g., a user) of the electronic device 2501. The display device 2560 may include, for example, a display, a hologram device, or a projector and control circuitry to control a corresponding one of the display, hologram device, and projector. According to an embodiment, the display device 2560 may include touch circuitry adapted to detect a touch, or sensor circuitry (e.g., a pressure sensor) adapted to measure the intensity of force incurred by the touch.

The audio module 2570 may convert a sound into an electrical signal and vice versa. According to an embodiment, the audio module 2570 may obtain the sound via the input device 2550, or output the sound via the sound output device 2555 or a headphone of an external electronic device (e.g., an electronic device 2502) directly (e.g., wiredly) or wirelessly coupled with the electronic device 2501.

The sensor module 2576 may detect an operational state (e.g., power or temperature) of the electronic device 2501 or an environmental state (e.g., a state of a user) external to the electronic device 2501, and then generate an electrical signal or data value corresponding to the detected state. According to an embodiment, the sensor module 2576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2577 may support one or more specified protocols to be used for the electronic device 2501 to be coupled with the external electronic device (e.g., the electronic device 2502) directly (e.g., wiredly) or wirelessly. According to an embodiment, the interface 2577 may include, for example, a high definition multimedia interface (HDMI), a universal serial bus (USB) interface, a secure digital (SD) card interface, or an audio interface.

A connecting terminal 2578 may include a connector via which the electronic device 2501 may be physically connected with the external electronic device (e.g., the electronic device 2502). According to an embodiment, the connecting terminal 2578 may include, for example, a HDMI connector, a USB connector, a SD card connector, or an audio connector (e.g., a headphone connector), The haptic module 2579 may convert an electrical signal into a mechanical stimulus (e.g., a vibration or a movement) or electrical stimulus which may be recognized by a user via his tactile sensation or kinesthetic sensation. According to an embodiment, the haptic module 2579 may include, for example, a motor, a piezoelectric element, or an electric stimulator.

The camera module 2580 may capture a still image or moving images. According to an embodiment, the camera module 2580 may include one or more lenses, image sensors, image signal processors, or flashes.

The power management module 2588 may manage power supplied to the electronic device 2501. According to one embodiment, the power management module 2588 may be implemented as at least part of, for example, a power management integrated circuit (PMIC).

The battery 2589 may supply power to at least one component of the electronic device 2501. According to an embodiment, the battery 2589 may include, for example, a primary cell which is not rechargeable, a secondary cell which is rechargeable, or a fuel cell.

The communication module 2590 may support establishing a direct (e.g., wired) communication channel or a wireless communication channel between the electronic device 2501 and the external electronic device (e.g., the electronic device 2502, the electronic device 2504, or the server 2508) and performing communication via the established communication channel. The communication module 2590 may include one or more communication processors that are operable independently from the processor 2520 (e.g., the application processor (AP)) and supports a direct (e.g., wired) communication or a wireless communication. According to an embodiment, the communication module 2590 may include a wireless communication module 2592 (e.g., a cellular communication module, a short-range wireless communication module, or a global navigation satellite system (GNSS) communication module) or a wired communication module 2594 (e.g., a local area network (LAN) communication module or a power line communication (PLC) module). A corresponding one of these communication modules may communicate with the external electronic device via the first network 2598 (e.g., a short-range communication network, such as Bluetooth™, wireless-fidelity (Wi-Fi) direct, or infrared data association (IrDA)) or the second network 2599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2592 may identify and authenticate the electronic device 2501 in a communication network, such as the first network 2598 or the second network 2599, using subscriber information (e.g., international mobile subscriber identity (IMSI)) stored in the subscriber identification module 2596.

The antenna module 2597 may transmit or receive a signal or power to or from the outside (e.g., the external electronic device) of the electronic device 2501. According to an embodiment, the antenna module 2597 may include one or more antennas, and, therefrom, at least one antenna appropriate for a communication scheme used in the communication network, such as the first network 2598 or the second network 2599, may be selected, for example, by the communication module 2590 (e.g., the wireless communication module 2592). The signal or the power may then be transmitted or received between the communication module 2590 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2501 and the external electronic device 2504 via the server 2508 coupled with the second network 2599. Each of the electronic devices 2502 and 2504 may be a device of a same type as, or a different type, from the electronic device 2501. According to an embodiment, all or some of operations to be executed at the electronic device 2501 may be executed at one or more of the external electronic devices 2502, 2504, or 2508. For example, if the electronic device 2501 should perform a function or a service automatically, or in response to a request from a user or another device, the electronic device 2501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2501. The electronic device 2501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2540) including one or more instructions that are stored in a storage medium (e.g., internal memory 2536 or external memory 2538) that is readable by a machine (e.g., the electronic device 2501). For example, a processor (e.g., the processor 2520) of the machine (e.g., the electronic device 2501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities.

According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
   a communication interface for wired or wireless communication;
   an input interface configured to receive a user input;
   a memory configured to store a message application for transmitting or receiving a message that includes a main message;
   a display; and
   a processor electrically connected to the communication interface, the input interface, the memory, and the display,
   wherein the processor is configured to:
     set a first interaction for displaying a first hidden message on the main message, the first interaction including information about at least one of an input type, an input position, an input frequency, and an input time of a user input, and an input order of user inputs corresponding to a plurality of areas of the main message;
     generate the message to include the main message and the first hidden message, the message being configured such that the first hidden message is displayed on the main message when at least one user input corresponding to the set first interaction is received; and
     transmit the generated message to an external device through the communication interface.

2. The electronic device of claim 1, wherein the processor is further configured to:
   display the first hidden message in a first area of the main message.

3. The electronic device of claim 2, wherein the processor is further configured to:
   display the main message on the display;
   receive a second user input through a second area of the main message displayed on the display; and
   determine the information about at least one of the type, the input position, the input frequency, the input time, and an input sequence of the user input used to display the first hidden message, based on the received second user input.

4. The electronic device of claim 3, wherein the second area is the same as the first area.

5. The electronic device of claim 2, wherein the processor is further configured to:
   display the main message on the display; and
   receive a second user input for selecting the first area of the main message displayed on the display through the input interface.

6. The electronic device of claim 1, wherein the external device is configured to:
   display the first hidden message on the main message, based on the user input used to display the first hidden message and corresponding to the set first interaction.

7. The electronic device of claim 6, wherein the processor is further configured to:
   determine a method of displaying the first hidden message on the main message, based on at least one of a holding time, an input path, and an input speed of the user input used to display the first hidden message.

8. The electronic device of claim 7, wherein the processor is further configured to:
   set the first hidden message to change at least one of transparency, boundary blending, size, resolution, image property, and video image playback time of the first hidden message, based on the user input.

9. The electronic device of claim 1, wherein the processor is further configured to:
   receive a first user input for setting the first interaction through the input interface; and
   determine the information about at least one of the type, the input position, the input frequency, the input time, and an input sequence of the user input used to display the first hidden message, based on the received first user input.

10. The electronic device of claim 1, wherein the main message includes a first image,
    wherein the first hidden message includes a second image, and
    wherein the processor is further configured to display the first hidden message on the main message by displaying the second image on the first image.

11. The electronic device of claim 1, wherein the user input used to display the first hidden message and corresponding to the set first interaction includes at least one of a tap input, a drag input, a blow input, and a pinch input.

12. The electronic device of claim 1, wherein the processor is further configured to:
    set a second interaction for displaying a second hidden message on the main message, the second interaction including at least one of the type, the input position, the input frequency, the input time, and an input sequence of another user input used to display the second hidden message; and
    generate the message to include the main message, the first hidden message, and the second hidden message and transmit the generated message to the external device through the communication interface.

13. The electronic device of claim 1, wherein the processor is further configured to:
    display, on the main message, an indicator for indicating that the first hidden message is included in the message.

14. An electronic device comprising:
    a communication interface for wired or wireless communication;
    an input interface configured to receive a user input;
    a memory configured to store a message application for transmitting or receiving a message;
    a display; and
    a processor electrically connected to the communication interface, the input interface, the memory, and the display,
    wherein the processor is configured to:
        receive a message including a main message and a first hidden message through the communication interface, the message being configured such that the first hidden message is displayed on the main message when a user input corresponding to a first interaction is received, and wherein the first interaction includes information about at least one of an input type, an input position, an input frequency, and an input time of a user input, and an input order of user inputs corresponding to a plurality of areas of the main message;
        display the main message on the display; and
        display the first hidden message on the main message when receiving at least one user input corresponding to the first interaction through the input interface.

15. The electronic device of claim 14, wherein the processor is further configured to:
    display the first hidden message in a first area of the main message displayed on the display.

16. The electronic device of claim 14, wherein the main message includes a first image,
    wherein the first hidden message includes a second image, and
    wherein the processor is configured to display the first hidden message on the main message by displaying the second image on the first image.

17. The electronic device of claim 14, wherein the processor is further configured to:
    set at least one of transparency, boundary blending, size, resolution, image property, and video image playback time of the first hidden message, based on the user input used corresponding to the first interaction.

18. The electronic device of claim 14, wherein the processor is further configured to:
    determine whether to display the first hidden message, based on at least one of an input time and an input path of the user input.

19. The electronic device of claim 14, wherein the processor is further configured to:
    display the second hidden message on the main message, based on a state in which the first hidden message is displayed on the main message, wherein the state is determined based on the user input corresponding to the first interaction.

20. The electronic device of claim 14, wherein the processor is further configured to:
    display information about the first interaction on the main message when detecting a specified operation through a plurality of sensors or receiving a specified user input.

* * * * *